(12) United States Patent
Messersmith et al.

(10) Patent No.: US 8,796,394 B2
(45) Date of Patent: Aug. 5, 2014

(54) ANTIFOULING HYDROGELS, COATINGS, AND METHODS OF SYNTHESIS AND USE THEREOF

(75) Inventors: Phillip B. Messersmith, Clarendon Hills, IL (US); Jose Rivera, Waukegan, IL (US); Yong-Kuang Gong, Xian (CN)

(73) Assignee: Northwestern University, Evanston, IL (US)

( * ) Notice: Subject to any disclaimer, the term of this patent is extended or adjusted under 35 U.S.C. 154(b) by 777 days.

(21) Appl. No.: 12/869,387

(22) Filed: Aug. 26, 2010

(65) Prior Publication Data

US 2011/0052788 A1    Mar. 3, 2011

Related U.S. Application Data

(60) Provisional application No. 61/237,551, filed on Aug. 27, 2009.

(51) Int. Cl.
*C08L 77/06* (2006.01)
*C08F 290/14* (2006.01)

(52) U.S. Cl.
USPC ............................................ 525/436; 525/50

(58) Field of Classification Search
USPC .......................................... 525/523, 50, 436
See application file for complete search history.

(56) References Cited

U.S. PATENT DOCUMENTS

| | | | | |
|---|---|---|---|---|
| 2004/0249173 A1* | 12/2004 | Balme et al. | ................... | 549/355 |
| 2005/0250194 A1* | 11/2005 | Taylor et al. | ................... | 435/187 |
| 2006/0264390 A1* | 11/2006 | Eldrup et al. | ................... | 514/43 |
| 2008/0149566 A1* | 6/2008 | Messersmith et al. | ......... | 210/702 |
| 2008/0247984 A1* | 10/2008 | Messersmith et al. | ...... | 424/78.02 |
| 2009/0076241 A1* | 3/2009 | Lee | ............... | 528/184 |
| 2010/0113828 A1* | 5/2010 | Dalsin et al. | ................... | 564/153 |
| 2010/0137903 A1* | 6/2010 | Lee et al. | ...................... | 606/213 |
| 2010/0330025 A1* | 12/2010 | Messersmith et al. | ...... | 424/78.17 |
| 2012/0078296 A1* | 3/2012 | Lee | ............... | 606/214 |

OTHER PUBLICATIONS

Sugiura, et al., Colloids and Surfaces B: Biointerfaces 2008, 63, (2), 301-305.
Sun, et al., Electrophoresis 2008, 29, (13), 2760-2767.
Sun, et al., Bioconjugate Chemistry 2006, 17, (1), 52-57.
Voros, et al., Biomaterials 2002, 23, (17), 3699-3710.
Wagner, et al., J. Biomedical Materials Research Part A 2003, 66A, (1), 62-78.
Wei, et al., J. Polym. Sci. Part A: Polym. Chem. 2005, 43, (13), 2941-2949.
Yamaguchi, et al., Biomacromolecules 2005, 6, (4), 1921-1930.
Yeh, et al., Langmuir 2008, 24, (9), 4907-4916.
Zhang, et al., J. Phys. Chem. C 2009, 113, (12), 4839-4847.
Zhen, et al., Langmuir 2004, 20, (24), 10464-10473.
Zhu, et al., Chem. Commun. 2006, (2), 153-155.
Alexandre, et al., Macromolecular Bioscience 2004, 4, (7), 639-648.
Catron, et al., Biointerphases 2006, 1, (4), 134-141.
Cerruti, et al., Langmuir 2008, 24, (19), 10646-10653.
Chapman, et al., Langmuir 2001, 17, (4), 1225-1233.
Chi, et al., Chemistry—An Asian Journal 2009, 4, (1), 135-142.
Lima, et al., Macromolecules 1995, 28, (20), 6787-6794.
Dalsin, et al., J. Am. Chem. Soc. 2003, 125, (14), 4253-4258.
Dalsin, et al., Langmuir 2005, 21, (2), 640-646.
Dalton, et al., Macromolecular Bioscience 2008, 8, (10), 923-931.
De Feijter, et al., Biopolymers 1978, 17, (7), 1759-1772.
Dimitrov, et al., Macromolecules 2006, 39, (6), 2423-2426.
Ernst, et al., Langmuir 2008, 24, (18), 10259-10264.
Fan, et al., J. Am. Chem. Soc. 2005, 127, (45), 15843-15847.
Gasteier, et al., Macromolecular Bioscience 2007, 7, (8), 1010-1023.
Groll, et al., J. Biomedical Materials Research, Part A 2005, 74, (4), 607-617.
Groll, et al., Langmuir 2005, 21, (5), 1991-1999.
Hiemstra, et al., J. Am. Chem. Soc. 2007, 129, (32), 9918-9926.
Hoffmann, et al., J. Biomater. Sci. Polymer Edn. 2006, 17, (9), 985-996.
Iguerb, et al., Surf. Interface Anal. 2008, 40, (3-4), 386-390.
Ito, et al., Acta Biomaterialia 2007, 3, (6), 1024-1032.
Jans, et al., Langmuir 2008, 24, (8), 3949-3954.
Keys, et al., Macromolecules 1998, 31, (23), 8149-8156.
Khire, et al., Macromolecules 2006, 39, (15), 5081-5086.
Kurrat, et al., Colloids and Surfaces B: Biointerfaces 1998, 11, (4), 187-201.
Lan, et al., Biosensors & Bioelectronics 2005, 20, (9), 1697-1708.
Lee, B. P., et al., Biomacromolecules 2002, 3, (5), 1038-1047.
Lee, B. P., et al., Macromolecules 2006, 39, (5), 1740-1748.
Lee, H., et al., Adv. Mater. 2009, 21, (4), 431-434.
Lee, H., et al., Adv. Mater. 2008, 20, (9), 1619-1623.
Lee, H., et al., Nanotechnology in Biology and Medicine 2007, 3-1 thru 3-20.
Lee, H., et al., Nature 2007, 448, (7151), 338-341.
Lee, Y., et al., Adv. Mater. 2008, 20, (21), 4154-4157.
Lensen, et al., Langmuir 2007, 23, (14), 7841-7846.
Li, et al., Biomacromolecules 2006, 7, (11), 3112-3119.
Liu, et al., Macromol. Rapid Commun. 2007, 28, (3), 305-314.
Lucke, et al., Biomaterials 2000, 21, (23), 2361-2370.
McNamee, et al., Langmuir 2007, 23, (8), 4389-4399.
Nagahama, et al., J. Polymer Science: Part A: Polymer Chemistry 2008, 46, (18), 6317-6332.
Pavey, et al., Biomaterials 1999, 20, (9), 885-890.

(Continued)

*Primary Examiner* — Mark Eashoo
*Assistant Examiner* — Megan McCulley
(74) *Attorney, Agent, or Firm* — Quarles & Brady, LLP

(57) ABSTRACT

The invention provides an antifouling hydrogel comprising an effective amount of antifouling polymer modified with a compound containing catechol functional groups to yield a modified antifouling polymer comprising at least one catechol functional end group; and an effective amount of at least one oxidizing reagent, wherein the at least one oxidizing reagent reacts with the modified antifouling polymer to provide a modified antifouling polymer comprising at least one oxidized catechol end group, wherein an antifouling hydrogel is provided. Methods of synthesis, methods of use and kits of the antifouling hydrogel are also provided.

13 Claims, 21 Drawing Sheets

(56) References Cited

OTHER PUBLICATIONS

Popat, et al., Langmuir 2004, 20, (19), 8035-8041.
Ratner, et al., Annu. Rev. Biomed. Eng. 2004, 6, 41-75.
Ratner, et al., Biomaterials Science 2004, 201-218.
Schlapak, et al., Langmuir 2007, 23, (20), 10244-10253.
Schlapak, et al., Langmuir 2006, 22, (1), 277-285.
Schmidt, et al., J. Applied Polymer Science 2003, 87, (8), 1255-1266.
Scofield, J. Electron Spectroscopy and Related Phenomena 1976, 8, (2), 129-137.
Sebra, et al., Acta Biomaterialia 2007, 3, (2), 151-161.
Shah, et al., Langmuir 2008, 24, (13), 6837-6844.
Sinclair, et al., Biomaterials 2006, 27, (9), 2090-2094.
Statz, et al., Biofouling 2006, 22, (6), 391-399.

* cited by examiner solution A: antifouling polymer in solvent solution B: oxidizing agent in solvent step 1: mix solution A and B step 2: apply mixture to substrate by spin-coating, dip-coating, doctor blade or other method

ANTIFOULING HYDROGELS, COATINGS, AND METHODS OF SYNTHESIS AND USE THEREOF

CROSS-REFERENCE TO RELATED APPLICATIONS

This applications claims priority to U.S. Provisional Application No. 61/237,551, filed Aug. 27, 2009, the entirety of which is hereby incorporated by reference herein for all purposes.

STATEMENT REGARDING FEDERALLY SPONSORED RESEARCH

The invention was with government support under grant numbers DE 014193 and EB 005772 awarded by the National Institutes of Health. The government has certain rights in the invention.

FIELD OF THE INVENTION

This invention is directed to polymeric compositions that reduce or eliminate the non-specific protein adsorption and cell adhesion (biofouling) of various surfaces, and methods of synthesis and use thereof.

BACKGROUND OF THE INVENTION

Preventing the non-specific protein adsorption and cell adhesion on biosensors, biomedical devices, and implants is crucial for the performance of these devices.[1,2] Many strategies to prevent such non-specific protein adsorption and cell adhesion have been developed. For instance, a variety of polymers have been used to reduce protein, cell and bacterial adsorption at interfaces with biological tissues. Of these, poly(ethylene glycol) (PEG) is one of the most promising synthetic polymers to confer protein and cell resistance to devices having PEG immobilized onto the surface.[3]

Although ethylene glycol may be block-copolymerized with other hydrophobic polymers to enable surface immobilization of PEG via adsorption of the hydrophobic copolymer blocks,[4-6] a covalent attachment to the substrate is preferable for long term stability of PEG surface coatings. For that reason, a number of strategies have been developed to immobilize PEG onto the surfaces of biomaterials. The most frequently employed techniques are surface graft, including "graft to" and "graft from" methods. Thiol-terminated PEG self-assembly on gold[7-12] and PEG-silane reaction on the surfaces of indium tin oxide, silica and silicon[13-17] are typical "graft to" techniques. Polymerizable PEG monoacrylates are often employed to graft and polymerize from a surface with immobilized initiators.[18-24] PEG-bearing amine groups were also coupled with poly(N-hydroxysuccinimidyl methacrylate) films, hydrolyzed poly(methyl methacrylate) or silanized glass slides bearing aldehyde groups, respectively.[14, 25-29] Polyethylene glycols containing alkyne and cyclodiene terminal groups have also been grafted onto a N-(e-maleimidocaproyl) functionalized glass slides via an aqueous Diels-Alder reaction.[30] Bonding of PEG-biotin derivatives onto an avidin surface was performed,[31,32] and isocyanate-terminated star PEG was employed for preparing ultrathin coatings.[1, 33-36] PEG-bearing photoreactive groups have also been immobilized on surfaces by photocrosslinking.[37]

Each of these strategies require the presence of specific surface functional groups and extensive optimization of the surface. Therefore, developing a versatile immobilization strategy that is capable of robustly anchoring polymers onto a variety of material surfaces is extremely important for biomedical and other bio-related applications. For this purpose, the inventors has reported extensively on the adhesive characteristics of 3,4-dihydroxyphenylalanine (DOPA), an important component of mussel adhesive proteins, to anchor PEG and peptides on a wide number of substrates, including noble metals, semiconductors, metal oxides, synthetic polymers, ceramics and composites surfaces.[38-46]

The surface coverage and film thickness are two of the most important parameters influencing the antifouling performance of a PEG-coated surface. Groll and Gasteier et. al.[1,33,34] reported that PEG films with thicknesses between 3 and 10 nm were not able to prevent non-specific cell adhesion under standard cell culture conditions (10% fetal calf serum). However, thicker star-shaped PEG films (15-50 nm) were able to prevent cellular adhesion under the same conditions. In addition, such films did not induce thrombocyte adhesion and exhibited very good hemocompatibility. In general, conventional antifouling coatings applied in thicknesses ranging from 15-50 nm are effective at reducing the attractive interactions between fouling species (cells/proteins/bacteria) and the underlying substrate.

Star-shaped PEG polymers have been previously employed for the preparation of hydrogel coatings through complicated methods involving substrate surface modification and polymer cross-linking by irradiation,[47-51] or via reaction between the functionalized end-groups of the PEG stars.[35, 52-54] In this invention, we describe a facile strategy to prepare PEG nano-hydrogel coatings with tunable thickness for antifouling applications. The polymer building block is comprised of four-armed PEGs modified with dihydroxyhydrocinnamic acid (DOHA). This catechol-containing molecule has a similar molecular structure as DOPA, and it shares the same adhesive characteristics. Despite employing a polymer composition that has been shown to be adhesive to biological constituents, a surprising and unexpected outcome was obtained in which hydrogel coatings derived from DOHA-derivatized PEG were actually an effective antifouling agent for proteins, cells and bacteria when applied to various surfaces.

Although the hydrogel coatings known from the existing art decrease cell and protein adsorption on surface to varying degrees, complex manufacturing methods for these coatings in many cases prevent wide usability. For example, conventional techniques require the use of reactive, costly, difficult to synthesize and handle coating materials; they require the use of costly irradiation units, or complicated adhesion promoters; and/or they require laborious coating processes.

Accordingly, a need exists for an antifouling hydrogel coating that can be anchored in stably covalent fashion onto multiple substrate surfaces and can be obtained in simple fashion. A need also exists to improve the manufacturing process of such hydrogel coatings, such that, in particular, the use of adhesion promoters can be dispensed with and coatings of long-term stability are nevertheless obtained. Such a hydrogel coating and methods of synthesis and use thereof would substantially simplify the coating process and open up a broad spectrum of applications, and is not known in the existing art.

BRIEF SUMMARY OF THE INVENTION

The invention provides an antifouling hydrogel comprising an effective amount of antifouling polymer modified with a compound containing catechol functional groups to yield a modified antifouling polymer comprising at least one catechol functional end group; and an effective amount of at least one oxidizing reagent, wherein the at least one oxidizing reagent reacts with the modified antifouling polymer to provide a modified antifouling polymer comprising at least one oxidized catechol end group, wherein an antifouling hydrogel is provided.

In one embodiment, the modified polymer comprises at least two catechol end groups, although in other embodiments three, four or more catechol end groups are shown. For instance, in one embodiment, the modified antifouling polymer has a structure according to Formula I:

In some embodiments, the at least one oxidizing reagent is selected from the group consisting of periodates, peroxides, permanganate, biological enzymes and peroxidases. For instance, in one embodiment, the at least one oxidizing reagent is silver nitrate, while in other embodiments the at least one oxidizing reagent is $NaIO_4$. In other embodiments, the oxidizing reagent comprises silver nitrate and $NaIO_4$ in a 4:1 ethanol:water solution.

The invention also provides a method of synthesizing an antifouling hydrogel comprising the steps of modifying an effective amount of an antifouling polymer with an effective amount of a compound comprising at least two catechol functional groups to yield a modified antifouling polymer comprising at least two catechol end groups; and reacting the modified antifouling polymer with at least one oxidizing agent to yield a hydrogel comprising at least two oxidized catechol-end groups; thereby providing an antifouling hydrogel.

In one embodiment, the modified antifouling polymer has a structure according to Formula I:

Formula I

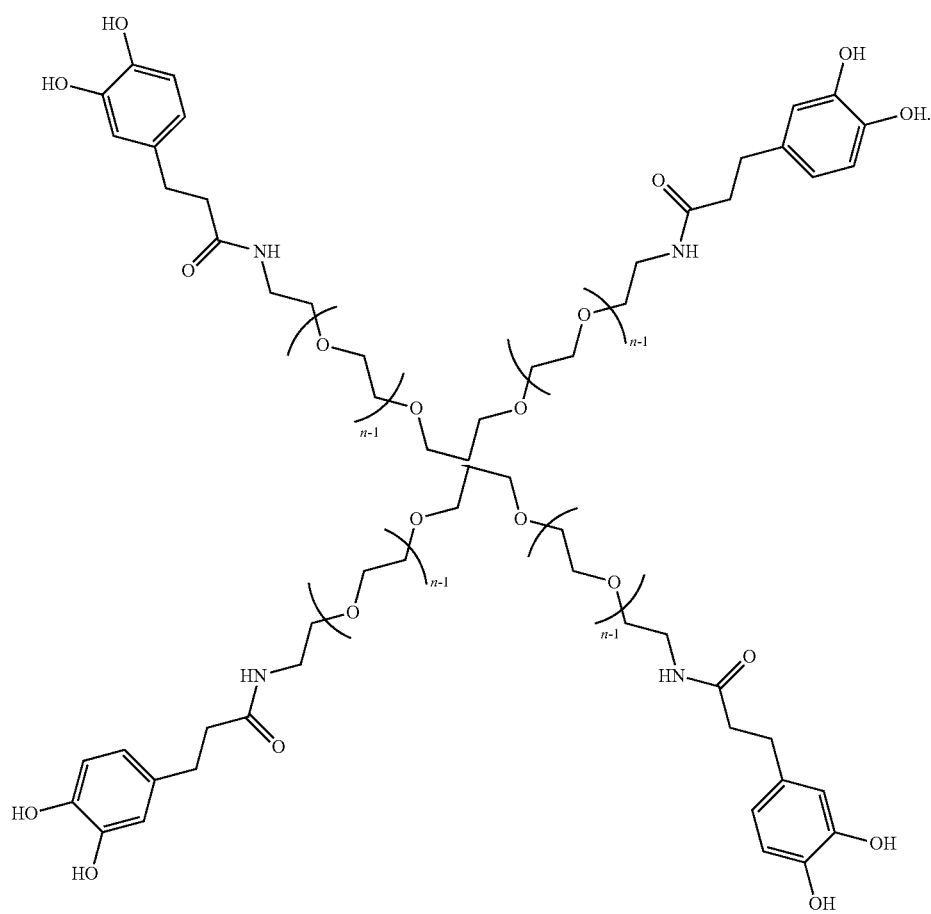

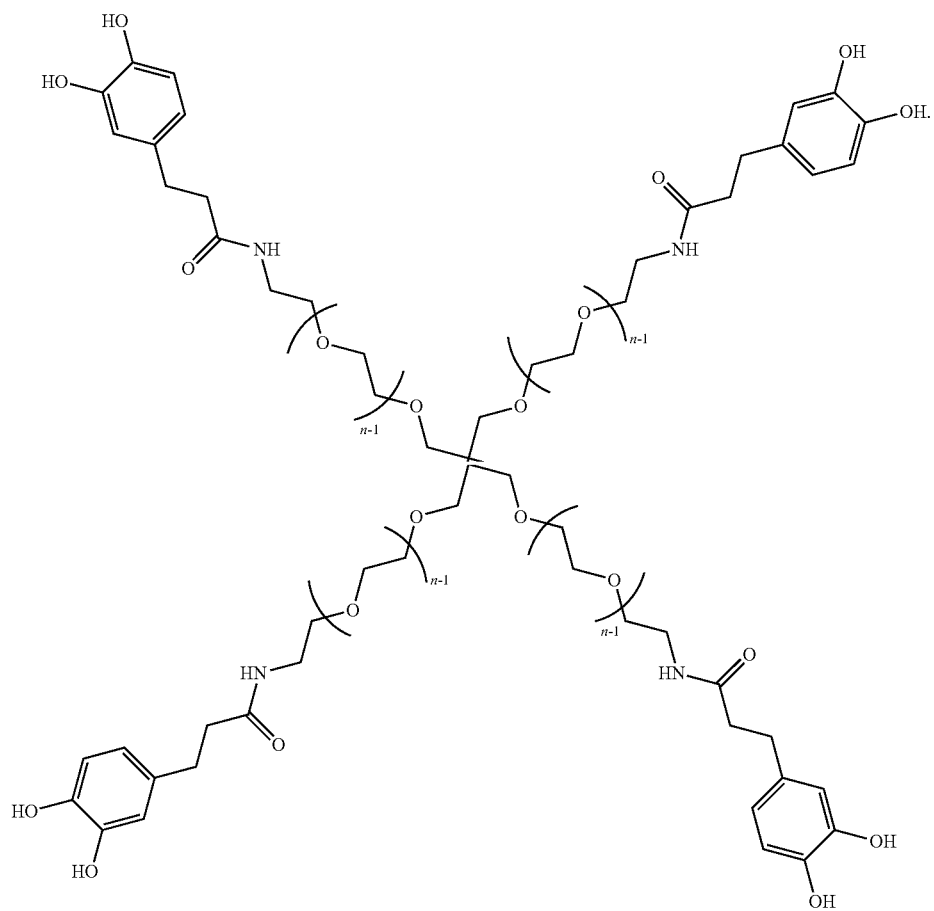

Formula I

In some embodiments, the at least one oxidizing reagent is selected from the group consisting of periodates, peroxides, permanganate, biological enzymes and peroxidases. For instance, in one embodiment, the at least one oxidizing reagent is silver nitrate, while in other embodiments the at least one oxidizing reagent is $NaIO_4$. In other embodiments, the oxidizing reagent comprises silver nitrate and $NaIO_4$ in a 4:1 ethanol:water solution.

The invention also provides a method of synthesizing an antifouling hydrogel comprising the steps of reacting an effective amount of PEG with an effective amount of DOHA to yield a modified PEG having a structure according to Formula I:

Formula I

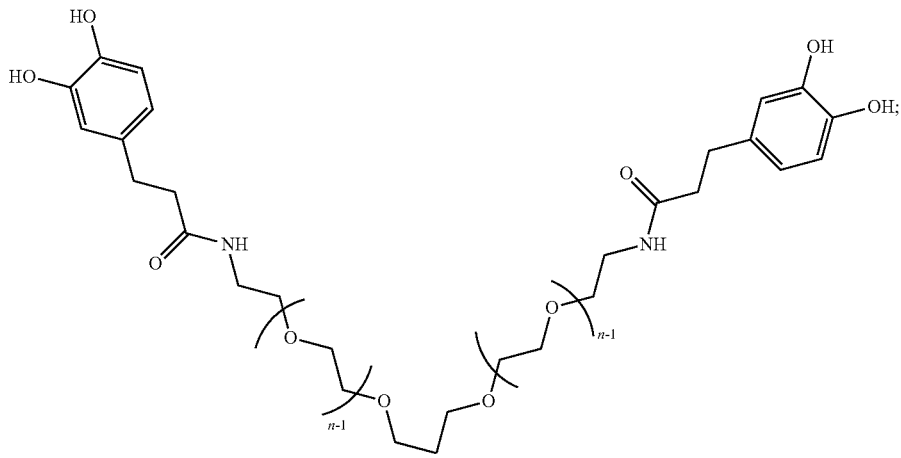

-continued

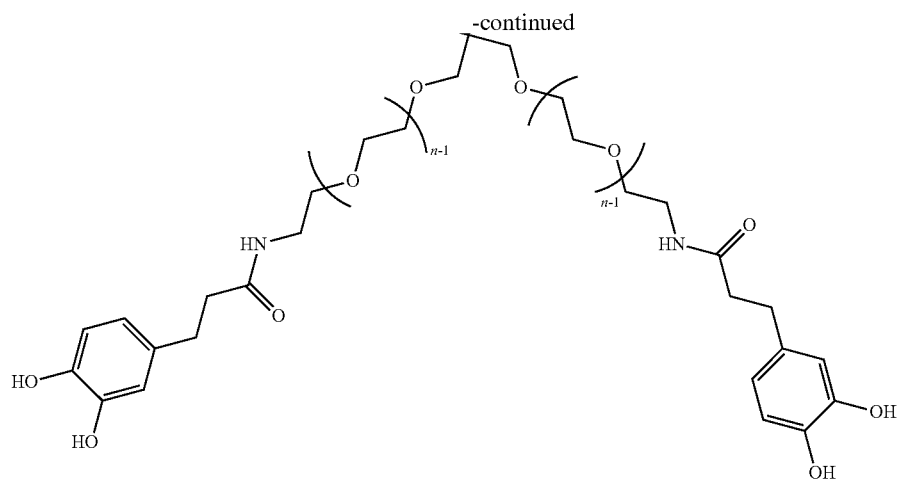

reacting an effective amount of Formula I with an effective amount of silver nitrate and NaIO$_4$ in a 4:1 ethanol:water solution to provide a modified Formula I comprising oxidized catechol-end groups; and coating the modified Formula I comprising oxidized catechol-end groups to a surface, thereby yielding an antifouling hydrogel.

In other embodiments, the invention provides a method of reducing or eliminating protein or microorganism adhesion on a surface, the method comprising the steps of contacting a portion of a surface with an antifouling hydrogel according to the present invention, wherein the contacted surface thereby reduces or eliminates protein or cell adhesion on the contacted surface.

In other embodiments, the invention provides a method of reducing or eliminating protein or microorganism adhesion on a surface, the method comprising the steps of contacting a portion of a surface with an effective amount of antifouling polymer to provide an adsorbed polymer layer on the surface; contacting a portion of the adsorbed polymer layer on the surface with an effective amount of an antifouling hydrogel according to the present invention, wherein the contacted surface thereby reduces or eliminates protein or cell adhesion on the contacted surface.

The invention also provides a kit comprising the hydrogel according to the present invention and instructions for use. In other embodiments, the kit comprises an antifouling polymer, a compound containing at least two catechol functional groups, an oxidizing reagent and instructions for use.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION OF THE INVENTION

Figure 1A:
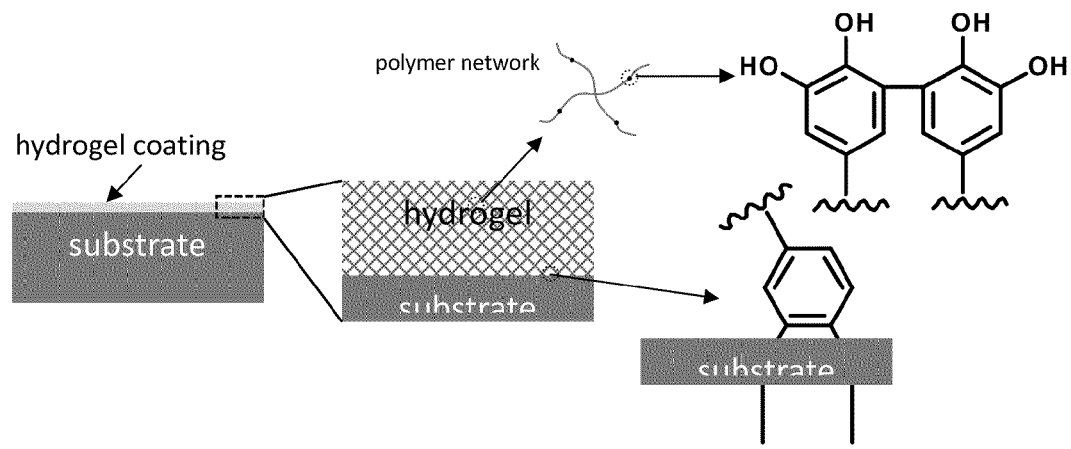
FIG. 1. A) Antifouling Hydrogels of the present invention. B) Catechol structure. C) Illustration of the synthesis of the antifouling hydrogel of the present invention.

The present invention provides novel antifouling hydrogels prepared by crosslinking the catechol end groups of a DOHA-coupled four-armed PEG and methods of synthesis and use thereof.

I. In General

In the specification and in the claims, the terms "including" and "comprising" are open-ended terms and should be interpreted to mean "including, but not limited to . . ." These terms encompass the more restrictive terms "consisting essentially of" and "consisting of."

As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

II. The Invention

The invention comprises an antifouling polymer modified with a compound containing catechol functional groups to yield a modified antifouling polymer. The modified antifouling polymer is then reacted with at least one oxidizing reagent to yield a modified antifouling polymer cross-linking with the oxidizing reagent. Upon administration to a surface, the modified antifouling polymer cross-linking with the at least one oxidizing reagent solidifies into an antifouling hydrogel coating on the surface. Methods of synthesis and use are also provided.

Antifouling Hydrogels.

The present invention surprisingly provides antifouling hydrogels that when applied to a surface, reduce or eliminate the non-specific protein adsorption and cell adhesion (biofouling) of the treated surface.

In one embodiment, the invention comprises an effective amount of an antifouling polymer modified with an effective amount of a compound containing catechol functional groups to yield a modified antifouling polymer comprising at least one catechol functional group. The modified antifouling polymer is then reacted with an effective amount of at least one oxidizing agent to yield a modified antifouling polymer comprising at least one oxidized catechol end group. By "effective amount" we mean means an amount of a compound that, when combined with another under reactive conditions, is sufficient to effect the expected reaction. The "effective amount" will vary depending on the compound, the reaction conditions, the desired application of the hydrogel, and other factors known to one of skill in the art.

Upon administration to a surface, the modified antifouling polymer comprising at least one oxidized catechol end group solidifies into an antifouling hydrogel (FIG. 1A). In one embodiment, the invention provides novel antifouling hydrogels prepared by crosslinking the catechol end groups of a DOHA-coupled four-armed PEG with silver nitrate and NaIO4 in a 4:1 ethanol:water solution.

By "antifouling polymer" we mean a polymer that prevents or reduces the attachment of mammalian proteins and both prokaryotic and eukaryotic cells to surfaces treated with the hydrogel of the present invention. In one embodiment, we mean a polymer that prevents or reduces the attachment of human fibrinogen, rodent fibroblast cells, and *S. Epidermidis* to surfaces treated with the hydrogel of the present invention.

Figure 2:
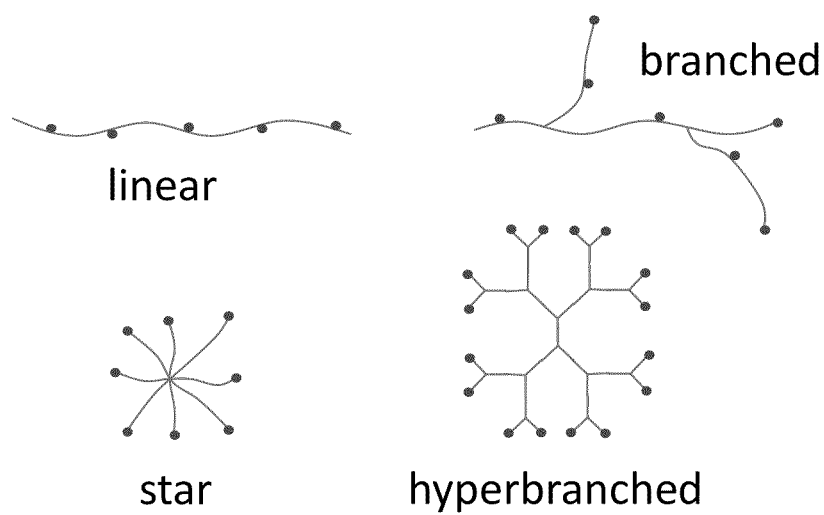
FIG. 2. Antifouling polymer structures effective in the hydrogels of the present invention.

Any antifouling polymer having the ability to be chemically derivatized with a catechol functional group, whereby each polymer chain must contain at least two catechol functional groups, may be an effective antifouling polymer as set forth in the present invention. The polymer can have various structures, including linear, branched, star, hyperbranched and the like (FIG. 2).

In one embodiment of the present invention, the antifouling polymer comprises a hydrophilic polymer comprising at least two hydroxyl groups. Examples of hydrophilic polymers suitable for use in the present invention include, but are not limited to, polyethylene glycol (PEG), polyvinyl alcohol (PVA), polypropylene glycol, di- and tri-block co-polymers of polyethylene glycol and polypropylene glycol, and any combination thereof. The hydrophilic polymer may be of any suitable size. For example, the hydrophilic polymer may have a number average molecular weight of about 400 or greater, although in some situations it may be desirable for the hydrophilic polymer to have a number average molecular weight between about 400 and about 100,000. However, higher or lower values may also optionally be utilized. The size of the hydrophilic polymer may be selected based on the needs of the user, such as to control the cross-linking density of the hydrogel.

In one embodiment, the catechol-modified antifouling polymer of the present invention is DOHA-modified 4-arm PEG (PEG-DOHA$_4$), as shown in Formula 1.

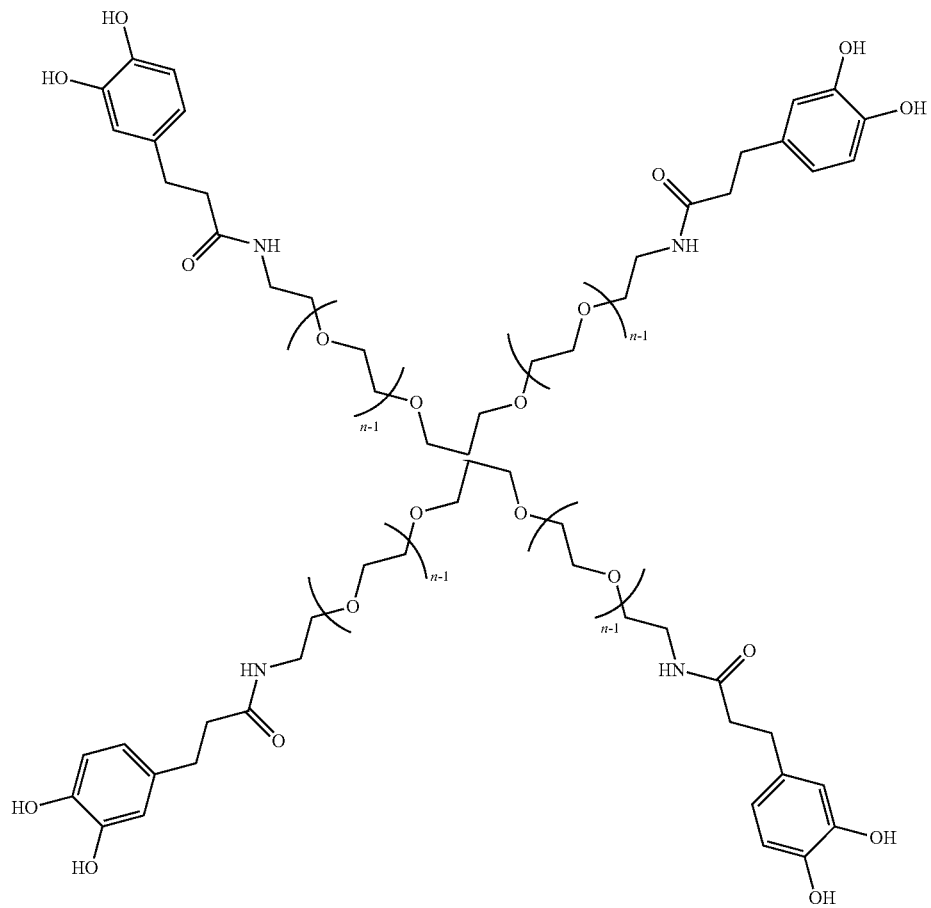

Formula I

In other embodiments, catechol-modified antifouling polymers including poly(N-substituted glycine) polymers, poly(zwitterion) polymers (such as poly(methacryloylphosphatidylcholine) or sulfobetaine or carboxybetaine containing acrylate polymers, and polysaccharides (such as hyaluronic acid or dextran) may be effective in the compositions and methods of the present invention.

Figure 1B:
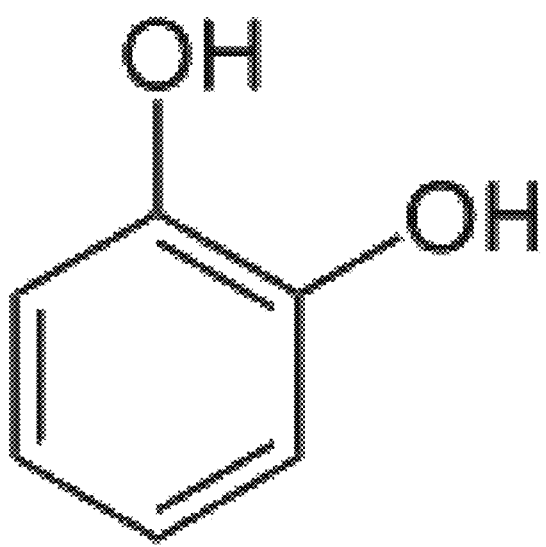

By "catechol functional group" we mean an organic compound with the molecular formula $C_6H_4(OH)_2$, also known as pyrocatechol or 1,2-dihydroxybenzene (see FIG. 1B). Catechol-containing compounds are well known in the art, and any catechol-containing compound having at least one catechol functional group may be useful in the present invention.

By "oxidizing reagent" we mean any reagent capable of oxidizing the catechol functional groups of the antifouling polymer, including, without limitation periodates, peroxides, permanganate, and biological enzymes such as tyrosine hydroxylase and peroxidases such as mushroom peroxidase. In some embodiments, multiple (i.e., two or more) oxidizing reagents can be used to prepare the antifouling hydrogel of the present invention. For instance, specific oxidizing reagents can be selected based on specific properties the oxidizing reagent can provide to the hydrogel, including, without limitation, antiproliferative, antineoplastic, antiinflammatory, antiplatelet, anticoagulant, antifibrin, antibacterial, antithrombin, antimitotic, antibiotic, and antioxidant properties and combinations thereof.

In one embodiment, the oxidizing reagent is selected from the group consisting of silver nitrate and/or $NaIO_4$ in a 4:1 ethanol:water solution. Silver nitrate (AgNO3) provides silver nanoparticles in the cross-linked hydrogel coating, which provide beneficial antibacterial properties to the hydrogel coating.

The compound containing at least one catechol group, when combined with the antifouling polymer and dissolved in a solvent under oxidative conditions (i.e., in the presence of an oxidizing reagent), yields a hydrogel comprising at least one catechol functional group now having the ability to be strongly immobilized onto a variety of substrate surfaces and resist fouling of proteins and microorganisms on the substrate surface. In one embodiment, by "combine" we mean physically or chemically coupled to the antifouling polymer using any method known to one of skill in the art. For instance, hydrogels may be chemically crosslinked using, for example, methods similar to those described by Muller in U.S. Pat. No. 5,789,464. Similarly, chemical crosslinking or polymerization methods may also be used to adhere hydrogels to surfaces, including biological tissues. U.S. Pat. No. 5,900,245, issued to Sawhney et al., describes applications of these techniques. These and other methods for the crosslinking or further polymerization of hydrogels are derived from methods used in the polymer industry and are well known in the art.

By "coating" we mean a thin layer of the modified antifouling polymer cross-linking with at least one oxidizing agent solidified into an antifouling hydrogel coating on the surface. In one embodiment, the hydrogel of the present invention may be applied in layers ranging in thickness from 1-10 nm, from 5-50 nm, from 15-300 nm and from 25-400 nm. The thickness of the coating will depend on the method of application and the polymer concentration. In general, the higher the polymer concentration the thicker the resulting coating.

Figure 1C:
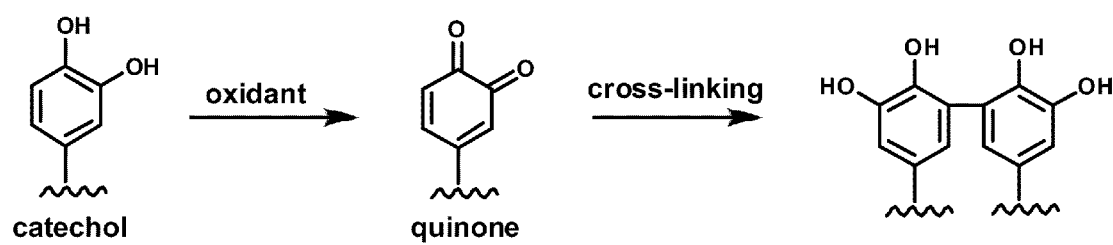

Specifically, in one embodiment, the hydrogel of the present invention comprises the polymer of Formula I reacted with at least one oxidizing reagent capable of oxidizing the catechol groups of Formula I to a quinine (FIG. 1C). The quinones formed from the catechol oxidation react with each other in an intermolecular reaction to form cross-links between the polymer molecules. Extensive cross-linking of solvated polymers gives rise to hydrogel formation when applied to a substrate surface.

In one embodiment, the antifouling hydrogel of the present invention may be biocompatible. The hydrogels of the present invention may be suitable for biological applications including both in vivo and in vitro applications due to their biocompatibility. By "biocompatible" we mean a polymer that does not have toxic or injurious effects on biological systems and exhibits minimal local inflammatory response in surrounding tissues. One example of a biocompatible macromonomer is those described in U.S. Patent Application No. 2008/0247980, incorporated by reference herein for all purposes.

In one embodiment, the hydrogel of the present invention comprises at least 5 mg/mL of the antifouling polymer, such as the polymer shown in Formula I. In other embodiments, the hydrogel includes at least 1-10 mg/ml, at least 5-15 mg/ml and, in still other embodiments, at least 10-25 mg/ml polymer. Such concentrations yield hydrogel coatings between 25-400 nm in thickness. In general, there is no upper limit on the amount of polymer present in the hydrogel of the present invention, and the higher the polymer concentration the thicker the resulting coating. One of skill in the art will be able to determine the desired concentration of polymer using skills known to the art as described herein.

Methods of Synthesis.

The present invention provides novel methods of preparing an antifouling hydrogel. The method comprises providing an effective amount of an antifouling polymer having the ability to be chemically derivatized with a catechol functional group, whereby each polymer chain must contain at least two catechol functional groups. The antifouling polymer is then modified with an effective amount of a compound containing catechol functional groups to yield a modified antifouling polymer comprising at least one catechol functional group. In some embodiments, two, four or more catechol end groups are shown.

Figure 3:
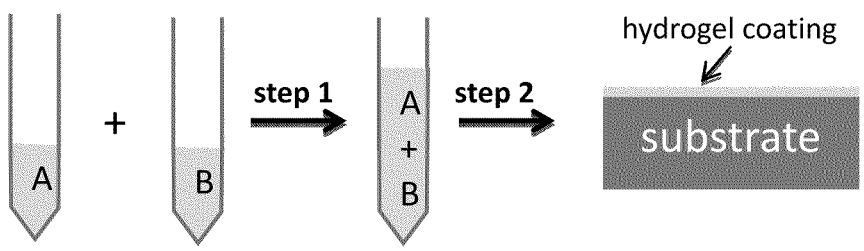
FIG. 3. Illustration of the synthesis and use of the antifouling hydrogel of the present invention.

The modified antifouling polymer is then reacted with an effective amount of at least one oxidizing agent to yield a modified antifouling polymer comprising at least one oxidized catechol end group. Upon administration to a surface, the modified antifouling polymer comprising at least one oxidized catechol end group solidifies into an antifouling hydrogel coating on the surface (FIG. 1C, FIG. 3).

Methods of Use

The present invention provides novel methods of reducing or eliminating protein or microorganism adhesion on a surface. The method comprises contacting a portion of a surface with an antifouling hydrogel, wherein the contacted surface thereby reduces or eliminates protein or microorganism adhesion on the contacted surface.

In one embodiment, the surface to be coated with the antifouling hydrogel may be pre-treated with a polymer such as PEG-DOHA4 to form a monolayer of adsorbed polymer on the surface. The pre-treated surface is then contacted with the antifouling hydrogel to yield the antifouling surface. Pre-treating the surface can result in better adhesion of the antifouling hydrogel to the substrate (i.e., a primer). Pre-treatment may be useful in situations where the surface is especially difficult to adhere to. In some embodiments, multiple layers of primer coats may be applied to the surface prior to contact with the antifouling hydrogel of the present invention to provide specific functionality or improved performance to the surface.

Any polymer known to one of skill in the art may be used for pre-treating a surface. In one embodiment, an antifouling polymer capable of preventing prevent biofouling of a surface may be used, including, for example, poly(N-substituted glycine) polymers, poly(zwitterion) polymers (such as poly (methacryloylphosphatidylcholine) or sulfobetaine or carboxybetaine containing acrylate polymers, and polysaccharides (such as hyaluronic acid or dextran).

By "reducing" we mean reducing protein or microorganism adhesion on the contacted surface by at least 90% as compared to a surface not having the antifouling hydrogel of the present invention. In some embodiments, protein or microorganism adhesion on the contacted surface is reduced by at least 95%-99.9%. For instance, in one embodiment, the surfaces contacted with the hydrogel coatings of the present invention exhibited significantly reduced protein adsorption (~90%), bacteria (99%) and mammalian cell (99.5%) adhesion as compared to unmodified surfaces.

By "protein" we mean any protein known to one of skill in the art that can cause biofouling of a surface. By "biofouling" we mean the undesirable accumulation of microorganisms, proteins and more on a surface.

By "microorganism" we mean any type of cell that can cause biofouling of a surface, including bacteria, viruses, fibroblasts, fungi, archaea and protists, microscopic plants (green algae) and animals such as plankton and the planarian. By "bacteria" we mean all bacteria, including, for instance, the Staphylococcus family (*S. afermentans, S. aureus, S. auricularis, S. capitis, S. caprae, S. carnosus, S. cohnii, S. epidermidis, S. felis, S. haemolyticus, S. hominis, S. intermedius, S. lugdunensis, S. pettenkoferi, S. saprophyticus, S. schleiferi, S. sciuri, S. simulans, S. vitulus, S. warneri* and *S. xylosus*) and other bacteria including, without limitation, *acinetobacter baumannii, actinomyces israelii, actinomyces gerencseriae* and *propionibacteriaum propionicus, aspergillus astroviridae, babesia, bacillus, bacterioides, balantidium coli, borrelia, clostridium* and the like.

By "adhesion" we mean to prevent the stable and permanent attachment of proteins and microorganisms to a surface treated with the hydrogel coatings of the present invention.

The antifouling hydrogel of the present invention may be applied to any surface in need of preventing antifouling. By "applied" we mean any method of coating a surface known to the art, including spin-coating, painting, dipping, washing, spraying, brushing, and the like.

The thickness of the coating may vary according to the needs of the user and the surface to be treated, as well as the type of specific biofouling to be targeted. Using techniques known to one of skill in the art, these variables can be addressed without undue experimentation.

By "surface" or "substrate" we mean any material known to the art can be treated with the antifouling hydrogels of the present invention to reduce or eliminate protein or cell adhesion. For instance, the antifouling hydrogel and coatings of the present invention may be applied to a surface formed from polyurethane and its copolymers, silicone and its copolymers, ethylene vinyl-acetate, thermoplastic elastomers, polyvinyl chloride, polyolefins, cellulosics, polyamides, polytetrafluoroethylenes, polyesters, polycarbonates, polysulfones, and acrylonitrile butadiene styrene copolymers; acrylics; metals and alloys based on titanium, stainless steel, nickel-chrome, nitinol or cobalt-chrome; ceramics of alumina and glass-ceramics and the like. For instance, the surface can comprise a metallic material or an alloy such as, but not limited to, cobalt chromium alloy (ELGILOY), stainless steel (316L), high nitrogen stainless steel, e.g., BIODUR 108, cobalt chrome alloy L-605, "MP35N," "MP20N," ELASTINITE (Nitinol), tantalum, nickel-titanium alloy, platinum-iridium alloy, gold, magnesium, or combinations thereof "MP35N" and "MP20N" are trade names for alloys of cobalt, nickel, chromium, and molybdenum available from Standard Press Steel Co., Jenkintown, Pa. "MP35N" consists of 35% cobalt, 35% nickel, 20% chromium, and 10% molybdenum. "MP20N" consists of 50% cobalt, 20% nickel, 20% chromium, and 10% molybdenum. Surfaces comprising bioabsorbable or biostable polymers could also be used with the embodiments of the present invention.

The surface may be part of any medical device that comes in contact with a patient, including but not limited to self-expandable stents, balloon-expandable stents, stent-grafts, grafts (e.g., aortic grafts), vascular grafts, artificial heart valves, cerebrospinal fluid shunts, pacemaker electrodes, guide wires, ventricular assist devices, artificial hearts, cardiopulmonary by-pass circuits, blood oxygenators, endocardial leads (e.g., FINELINE and ENDOTAK, available from Guidant Corporation, Santa Clara, Calif.), catheters, implantable vascular access ports, blood storage bags, vascular stents, blood tubing, central venous catheters, arterial catheters, vascular grafts, intraaortic balloon pumps, heart valves, cardiovascular sutures, total artificial heart and ventricular assist pump, extracorporeal devices such as blood oxygenators, blood filters, hemodialysis units, hemoperfusion units, plasmapheresis units, and hybrid artificial organs such as pancreas or liver and artificial lungs and the like.

Kits.

In an alternate embodiment of the invention, a kit for preparing and using the novel antifouling hydrogel of the present invention is provided. In one embodiment, the kit comprises an antifouling hydrogel according to the present invention and instructions for use. In an alternate embodiment the kit comprises an antifouling polymer, an oxidizing reagent, and instructions for synthesis and use.

By "instructions for use" we mean a publication, a recording, a diagram, or any other medium of expression which is used to communicate the usefulness of the invention for one of the purposes set forth herein. The instructional material of the kit can, for example, be affixed to a container which contains the present invention or be shipped together with a container which contains the invention. Alternatively, the instructional material can be shipped separately from the container or provided on an electronically accessible form on a internet website with the intention that the instructional material and the biocompatible hydrogel be used cooperatively by the recipient.

The following examples are, of course, offered for illustrative purposes only, and are not intended to limit the scope of the present invention in any way. Indeed, various modifications of the invention in addition to those shown and described herein will become apparent to those skilled in the art from the foregoing description and the following examples and fall within the scope of the appended claims.

III. EXAMPLES

Material and Methods 4-arm-polyethylene glycol-amine (PEG-$(NH_2)_4$), Mw=10000 was purchased from SunBio, Inc. Walnut Creek, Calif. 3,4-dihydroxyhydrocinnamic acid (DOHA), chloroform, N,N dimethylformamide, ethyl ether, triethylamine, and 2-propanol were obtained from Sigma (Milwaukee, Wis.). (1-Hydroxybenzotriazole (HOBt) was obtained from Novabiochem Corp. (La Jolla, Calif.), and O-(benzotriazol-1-yl)-N,N,N',N'-tetramethyluronium hexafluorophosphate (HBTU) was acquired from Advanced ChemTech (Louisville, Ky.).

Synthesis of PEG-$DOHA_4$ Polymer. DOHA-modified 4-arm PEG (containing four DOHA end groups) (PEG-$DOPA_4$) (Formula I) was synthesized using standard carbodiimide coupling chemistry known to one of skill in the art, as described below.[55,56]

Figure 12:
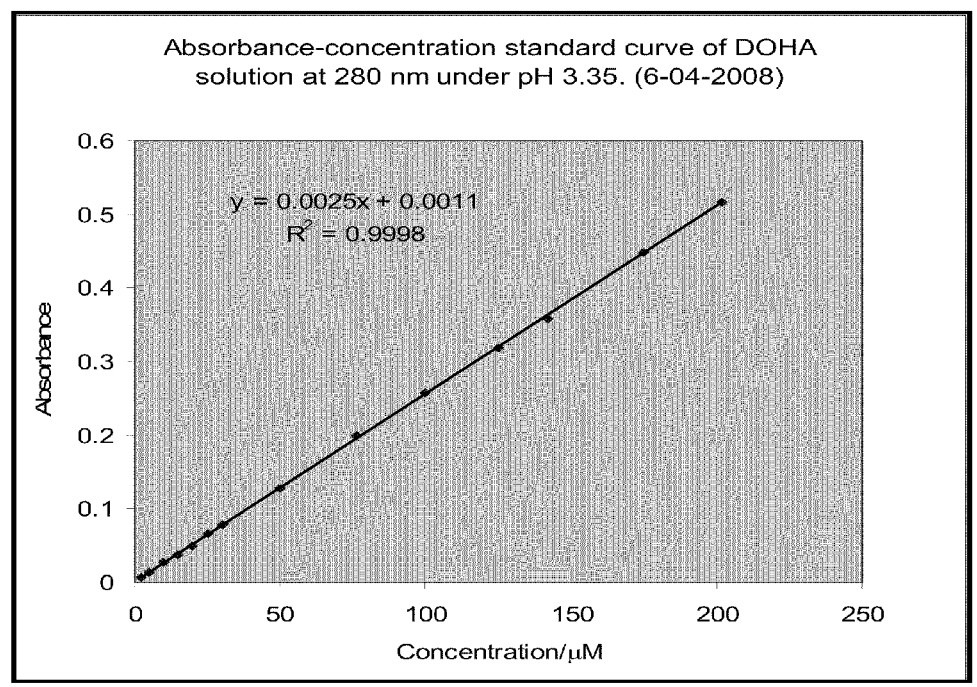
FIG. 12. DOHA absorbance with concentration at 280 nm. PEG-DOHA$_4$ (previously purified by dialysis) was dissolved in 0.32 mM HCl in water to form 0.30 mg/mL polymer solution. The absorbance of 0.30 mg/mL solution is 0.325 at 280 nm. The DOHA concentration in the polymer estimated from the standard curve is 0.129 mM. For the Mw=10000 4-armed PEG-DOHA$_4$, the concentration of DOHA is 4*0.30/10000=0.120 mM; These two values are similar, suggesting that all the ends of the polymer are capped with DOHA functionality.
Figure 13:
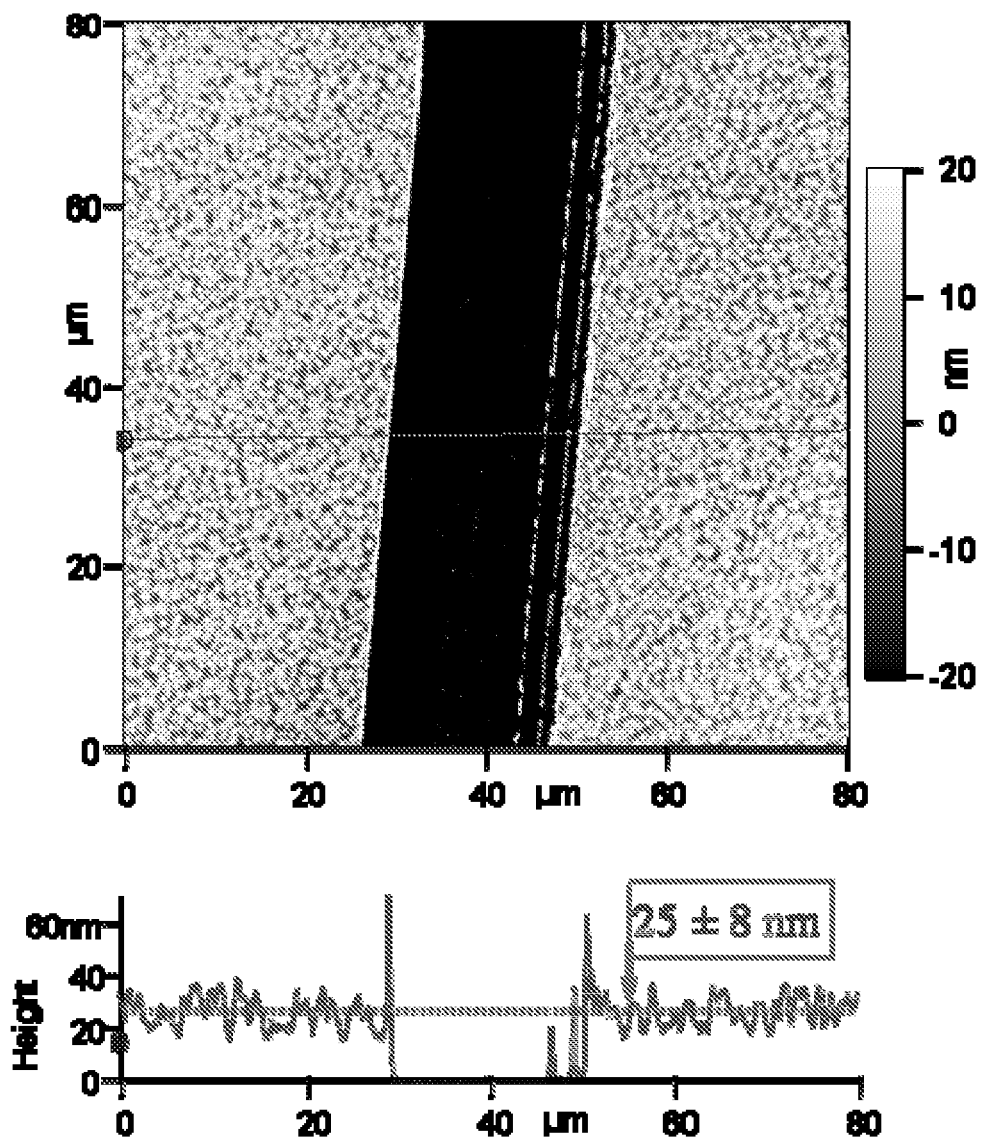
FIG. 13. AFM images of a 5 mg/ml PEG-DOHA$_4$ coating in air (height trace).

PEG-$(NH_2)_4$ (5.0 g, 0.50 mmol) was reacted with DOHA (3.2 mmol), HOBt (3.3 mmol), and triethylamine (6.6 mmol) in 50 mL of a 70:30(v/v) mixture of chloroform and dimethylformamide (DMF). HBTU (3.2 mmol) was then added, and the coupling reaction was carried out under magnetic stirring at room temperature for 1 h. After removing un-reacted solid agents and insoluble impurities by filtration, the filtrate was dripped into 350 mL of cold ether to precipitate the product. After filtration and vacuum drying, the crude product was dissolved in pH 3.5 water and dialyzed against 0.32 mM HCl in water to remove small molecular weight (<3500 Dalton) impurities. The purified product was collected by lyophilization and stored at −4° C. The structure of the DOHA-modified 4-arm PEG is shown in Formula I. The percentage of DOHA on the end groups is 100% as determined by UV-absorption measurements (see FIG. 12).

Preparation of Substrates. Silicon Wafers (University Wafer, Boston, Mass.) were Coated with 12-14 nm of $TiO_2$ by physical vapor deposition using electron beam evaporation (Edwards Auto500; $10^{-5}$ Ton with a $TiO_2$ target). The Si and $TiO_2$ coated wafers were then cut into 12×12 mm² pieces for spin-coating and ellipsometry measurements. Optical waveguide substrates (Microvacuum Ltd., Budapest, Hungary) were similarly coated with 8-12 nm of $TiO_2$. Prior to use, all substrates were sonicated successively for 10 min in 2-propanol and MQ water and dried in a stream of $N_2$. The $TiO_2$ coated surfaces were further cleaned by exposing to $O_2$ plasma (Harrick Scientific, Ossining, N.Y.) for 3 min. Waveguides without the antifouling hydrogel coating of the present invention were regenerated for reuse by sonicating in 0.1N HCl and water and 2-propanol for 10 min, then plasma cleaned immediately prior to reuse.

PEG-$DOHA_4$ Hydrogel Coatings. The polymer was dissolved in a 4:1 Ethanol:Water (v/v) solvent mixture and was oxidized by $NaIO_4$ using an amount that was half of the molar quantity of the catechols present (as determined using stoichiometry for periodate crosslinking of catechol-containing compounds, as oxidation of catechol to quinone requires two electrons, thus two Ag+ ions reduced per catechol). 10 microliters of the 5 or 10 mg/mL of the oxidized polymer solution were spin-coated on cleaned Si, Ti, PS, glass or $TiO_2$ substrates at a speed of 4000 rpm (30 seconds) within 30 min of the oxidization reaction. After storage in room conditions for 2 days, the coated substrates were immersed in MQ water for at least 2 h before wet thickness measurements by AFM.

In the preparation of PEG-$DOHA_4$ hydrogel coatings with a silver cross-linking agent, the above PEG-$DOHA_4$ solution was oxidized using a $AgNO_3$ molar amount that was double of the amount of the catechols present in the hydrogel (as determined using stoichiometry for periodate crosslinking of catechol-containing compounds). 5 or 10 mg/mL of the oxidized hydrogel was spin-coated on cleaned as described above. Si, Ti, PS, glass or $TiO_2$ surfaces at a speed of 4000 rpm (Chemat Technology Spin-Coater, Northridge, Calif., USA). After heating at 100° C. for 30-60 min, the crosslinked PEG-$DOHA_4$ hydrogel coating containing silver nanoparticles was stored in room conditions.

Ellipsometry and AFM Thickness Measurements. A M-2000 spectroscopic ellipsometer (J. A. Woollam, Lincoln, Nebr., USA) was used to measure PEG-DOHA$_4$ polymer thickness on silicon and TiO$_2$-coated silicon wafer substrata. Measurements were made at wavelengths from 370-1000 nm. The spectra were fitted with multilayer models in the WVASE32 software (J. A. Woollam Lincoln, Nebr., USA). Optical properties of the bare substrata were fitted using a standard Si or TiO$_2$ model, while properties of the polymer layer were fitted using a Cauchy model. The obtained ellipsometric thicknesses represent the "dry" thickness of the polymer under ambient conditions. The average thickness of six samples was obtained. Both the dry and wet thickness of the coatings were also measured by AFM in the tapping mode. AFM data was collected on an Asylum MFP-3D instrument (Asylum Research, Santa Barbara, Calif., USA).

X-Ray photoelectron spectroscopy (XPS). Survey and high resolution XPS spectra were collected on an Omicron ESCALAB (Omicron, Taunusstein, Germany) configured with a monochromated Al Kα (1486.8 eV) 300-W X-ray source, 1.5 mm circular spot size, a flood gun to counter charging effects, and in ultrahigh vacuum (≤10$^{-8}$ Torr). The takeoff angles were adjusted from 10° to 45° for angle/depth dependent measurements. Substrates were mounted on standard sample studs using double-sided Cu adhesive tape. All binding energies were calibrated using the aliphatic hydrocarbon component of the C1s carbon signal (defined as 285 eV). Analysis consisted of a broad survey scan (70.0 eV pass energy) and high-resolution scans (26.0 eV pass energy). Spectra were fitted using the Spectra Data Processor (XPS International, Mountain View, Calif., USA); specifically a Shirley background subtraction was used. Atomic sensitivity factors were used to normalize peak areas from high-resolution spectra to intensity values, which were then used to calculate atomic compositions.[57] See Table 1, Data for calculating the atomic percentage from XPS high resolution scans, using the equation $$C_x = \frac{n_x}{\sum n_i} = \frac{I_x/S_x}{\sum I_i/S_i}$$

where C is the atomic fraction, I is the peak intensity, S is the sensitivity factor and x is the element of interest. The sensitivity factors where empirical values specific for the XPS instrument used.

TABLE 1

Data for calculating the atomic percentage from XPS high resolution scans.

| | sensitivity factors | peak intensities (counts-eV) | atomic % |
|---|---|---|---|
| C1s | 1 | 8749.4 | 71% |
| O1s | 2.85 | 9946.9 | 28% |
| Ag3d[5/2] | 10 | 332.9 | 0.27% |

Contact Angle Measurements. The wettability of surfaces before and after modification with the hydrogel coating of the present invention was measured using a contact angle goniometer with an auto pipetting system (Rame-Hart, Mountain Lakes, N.J., USA). Advancing and receding contact angles were measured three times on each surface with ultrapure H$_2$O and the mean and standard deviation were reported.

In situ Optical Waveguide Light Mode Spectroscopy (OWLS) Measurements of Protein Adsorption and PEG-DOHA$_4$ Coatings. The adsorption of fibrinogen from human plasma was investigated. The protein was dissolved at 3 mg/mL in HEPES buffer (10 mM HEPES, 150 mM NaCl, pH=7.4). OWLS (model OWLS110, MicroVacuum Ltd, Budapest, Hungary) was used for monitoring in situ protein adsorption because the sensitivity is near 0.5 ng/cm$^2$, which correlates to approximately 0.5% of an average protein monolayer.[58, 59] For in situ protein-adsorption experiments, grating coupler waveguide sensor chips (model OW 2400, MicroVacuum Ltd, Budapest, Hungary), modified with TiO$_2$ (vide ante), were spin-coated with the PEG-DOHA$_4$ polymer hydrogel solution of the invention as described above. The sensor chips were then inserted into the OWLS instrument and exposed to HEPES buffer through the flow-cell for at least 4 hours to allow for equilibration. The measurement head was mounted in the sample chamber and heated to 37° C.; the signal was recorded to ensure a stable baseline. A protein solution (1 mL total volume) was injected into the flow-through cell in stopped flow mode. The waveguide sensor was exposed to the protein solution for 60 minutes, subsequently rinsed with HEPES buffer (2 mL), and allowed to equilibrate for another 60 minutes. The measured in-coupling angles, $\alpha_{TM}$ and $\alpha_{TE}$ were converted to effective refractive indices $N_{TM}$ and $N_{TE}$ by the MicroVacuum software. Refractive index changes at the sensor surface were converted to adsorbed mass using de Feijter's formula.[60] The refractive indices of buffer solutions were measured using a refractometer (J157 automatic refractometer, Rudolph Research) under identical experimental conditions. A refractive index value of 1.33127 was used for the HEPES buffer, and a standard value of 0.182 cm$^3$/g was used for the refractive index increment (dn/dc) in the protein-adsorption calculations. The large mass increase upon injection of protein solution reflects protein adsorption as well as the change in refractive index of the buffer solution covering surface as the solution became loaded with proteins.

The equilibrium adsorbed amount of the PEG-DOHA$_4$ polymer hydrogel solution of the invention on TiO$_2$ was also measured by OWLS. Waveguide chips deposited with TiO$_2$ were brought into contact with 10 mg/mL, PEG-DOHA$_4$ polymer hydrogel solution of the invention in HEPES buffer (10 mM HEPES, 150 mM NaCl, pH=7.4) for 2 h at 37° C. The adsorption reached equilibrium around 1 h. After rinsing with copious amount of the buffer, the firmly adsorbed polymer layer was 190±40 ng/cm$^2$. See Table 2.

TABLE 2

Fibrinogen adsorption amounts on different PEG-DOHA$_4$ polymer modified films.

| Surfaces | Adsorbed fibrinogen mass (ng/cm$^2$) |
|---|---|
| 1 TiO$_2$ | 524 ± 126 |
| 2 Adsorbed PEG-DOHA$_4$ | 103 ± 15 |
| 3 PEG-DOHA4 hydrogel coating | 78 ± 26 |
| 4 Hydrogel coating on adsorbed PEG-DOHA$_4$ | 43 ± 32 |

As Table 2 clearly shows, a control surface having no antifouling polymer (row 1) had the highest amount of adsorbed fibrinogen. Row 2, showing a surface coated with PEG-DOHA4 had better results than the control, but row 3, showing a surface coated with the antifouling hydrogel coating of the present invention had dramatically better results at preventing fibrinogen adsorption on the surface. Row 4 shows a surface pretreated with PEG-DOHA4, with the hydrogel coating of the present invention adhered to the PEG-DOHA4 monolayer present on the surface. In this example, the pretreated surface offered the best results at preventing fibrinogen adsorption on the surface.

Mammalian cell-adhesion assays. 3T3-Swiss albino fibroblasts were maintained at 37° C. and 5% $CO_2$ in Dulbecco's modified Eagle's medium (DMEM) containing 10% fetal bovine serum (FBS) and 100 U mL$^{-1}$ of penicillin/streptomycin. Immediately before use, fibroblasts of passage 12-16 were harvested using 0.25% trypsin-EDTA, resuspended in DMEM with 10% FBS and counted using a hemacytometer.

Modified and unmodified $TiO_2$ substrates were placed in a 12-well tissue-culture polystyrene plate and sterilized by exposure to UV light for 30 minutes. After the surfaces were in contact with 1 ml of PBS for 1 h at 37° C., the buffer solution was aspirated and 1 mL, of DMEM containing FBS was added to each well. After incubation for 30 minutes at 37° C. and 5% $CO_2$, the fibroblast cell suspension was diluted, and cells were seeded on each surface at a density of $4.2 \times 10^3$ cells cm$^{-2}$. Four sets of the surfaces were separately maintained in DMEM with FBS at 37° C. and 5% $CO_2$ for 4, 24, 72 and 168 hours. Subsequently, the medium was aspirated from each well to remove any non-adherent cells and PBS was used to rinse the substrates and wells. Fibroblasts were stained with 2.5 mM calcein-AM in complete PBS for 50 min at 27° C., and transferred to new culture plates with PBS buffer for epifluorescent microscope counting. For the 7-day adhesion experiments, the surfaces were reseeded with 3T3 fibroblasts at a density of $4.2 \times 10^3$ cells cm$^{-2}$ on the third day after changing the media.

Quantitative cell-attachment data was obtained by acquiring three images from random locations on each surface using a Leica epifluorescence microscope (W. Nuhsbaum Inc., McHenry, Ill., USA) equipped with a SPOT RT digital camera (Diagnostics Instruments, Sterling Heights, Mich., USA). Three identical surfaces for each experiment were analyzed for statistical purposes, resulting in a total of 9 images per time point for each modification. The microscopy images were quantified using threshold analysis in Metamorph (Molecular Devices, Downingtown, Pa., USA).

Bacterial culture and assay. *Staphylococcus epidermidis* (*S. epidermidis*) were streaked from frozen glycerol stocks onto tryptic soy agar and incubated overnight at 37° C. A few colonies were then used to inoculate 25 nit of sterile tryptic soy broth (TSB) and grown overnight at 37° C. The bacterial suspension was then seeded on each of the bare and PEG-DOHA$_4$ polymer hydrogel coated $TiO_2$ surfaces with concentration of between $1-9 \times 10^8$ CFU in 12-well cell culture plate. Before contact with the bacteria, the surfaces were sterilized by spraying 70% ethanol solution on the back side and UV irradiation of the surface for 30 min. The surfaces were equilibrated with sterilized MQ water for 4 h and then the culture medium (PBS: tryptic soy broth=1:1) for 1 h. After incubation at 37° C. and under gently rocking movement for 4, 24 and 72 h, the surfaces were taken out and rinsed with PBS to remove loosely adhered bacteria.

The attached bacteria were then stained with 2 μL/mL Syto 9 in PBS and visualized using a Leica epifluorescence microscope (40× magnification). Images were taken from 3 random places on each substrate and the bacterial cell area coverage was determined by threshold image analysis as explained previously for fibroblast cell adhesion.

Figure 4:
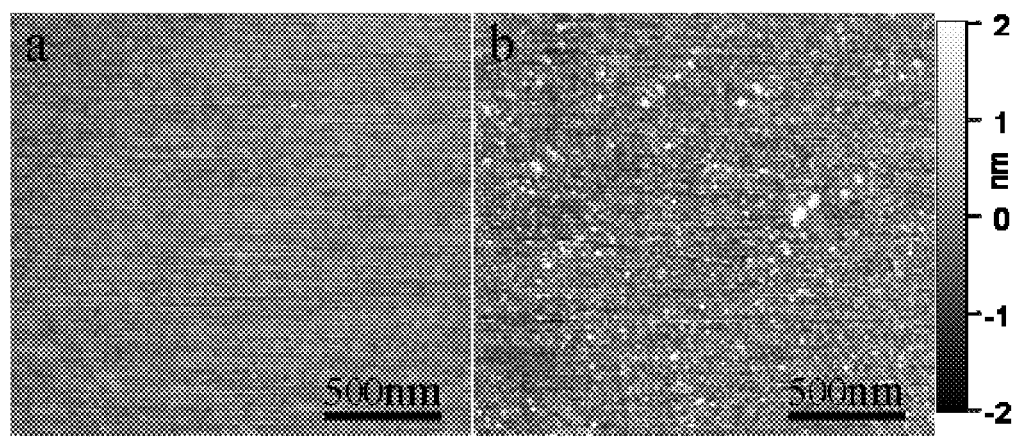
FIG. 4. AFM height images. A) TiO$_2$; and B) 10 mg/mL PEG-DOHA$_4$ adsorbed TiO$_2$ surfaces.

Hydrogel preparation. The PEG-DOHA$_4$ polymer has a very high solubility in water (500 mg/mL), and in pure ethanol (100 mg/mL). The high solubility is necessary to prepare the modified antifouling polymer. The hydrogel of the present invention can adsorb on $TiO_2$, $SiO_2$, and Si surfaces to form a layer less than 3 nm thick and still provide an effective antifouling hydrogel coating. The dry thickness of the adsorbed antifouling hydrogel from 10 mg/mL PEG-DOHA$_4$ PBS buffer solution measured by spectroscopic ellipsometer was 1.8±0.3 nm. AFM height image suggested aggregates of the polymer on $TiO_2$ surface (FIG. 4).

When a solution of 300 mg/mL of the hydrogel of the present invention in PBS buffer was mixed with an equal volume of 12 mg/mL sodium periodate (NaIO$_4$) in PBS, a bulk gel was formed in 46 sec. Such rapid gel formation prevents the application of the hydrogel to a surface, indicating that the hydrogel should be applied to the surface prior to complete crosslinking of the hydrogel.

Figure 5:
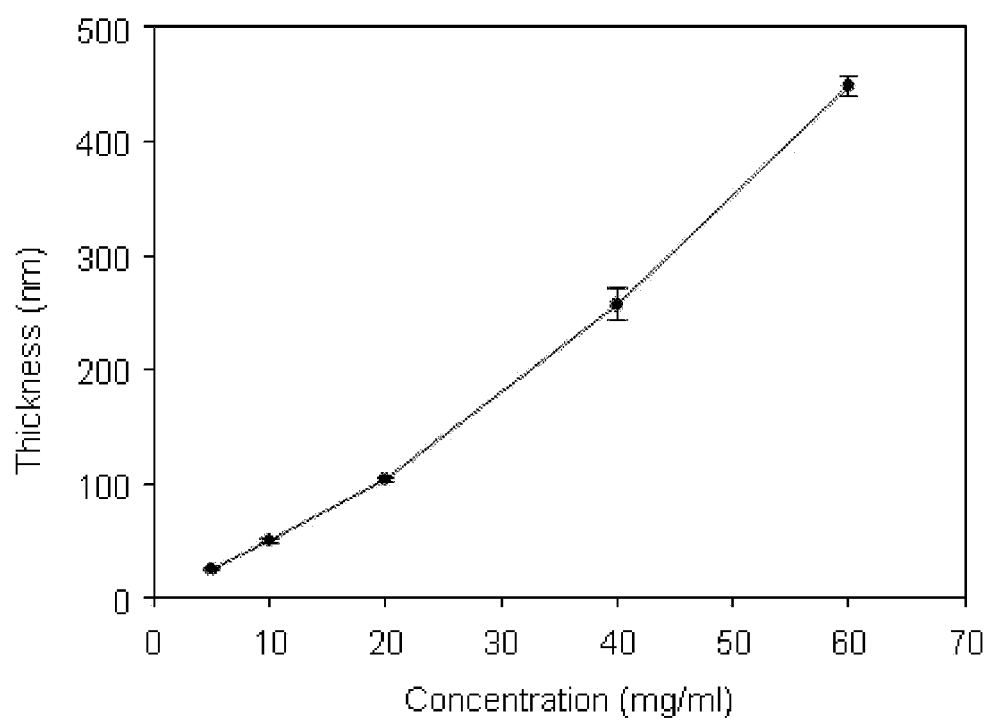
FIG. 5. PEG-DOHA$_4$ hydrogel film thickness change with the polymer concentration. The data are averages of six samples measured with an Ellipsometer and the respective standard deviations. The polymer solutions (5, 10, 20 mg/mL) contain proportional amount of NaIO$_4$ ($M_{DOHA}$:$M_{IO4}$=2:1 molar ratio). Higher concentration solutions (40 and 60 mg/mL) contained only 0.5 mg/mL NaIO$_4$ to prevent precipitation or fast gelation.

When an aqueous solution of the antifouling hydrogel/ NaIO$_4$ mixture of the present invention was spin coated on the substrates, it was difficult to form a smooth film due to slow evaporation of water and strong aggregation behavior of the polymer. Although it was easier to prepare a smooth film by using pure ethanol as solvent, the resultant coating rapidly dissolved, even if a saturated NaIO$_4$ (crosslinking) solution is used. For this reason, a 4:1(v/v) Ethanol:Water solvent mixture was employed and the DOHA catechol end groups were oxidized in the solution. 5.0 or 10 mg/mL of the oxidized polymer solution was spin-coated on cleaned Si, PS, glass or $TiO_2$ substrate at 4000 rpm for 30 seconds to yield the smooth, antifouling hydrogel coating of the present invention. The thickness of the coating, as measured by ellipsometry, increased with the polymer solution concentration used, as shown in FIG. 5.

Figure 14:
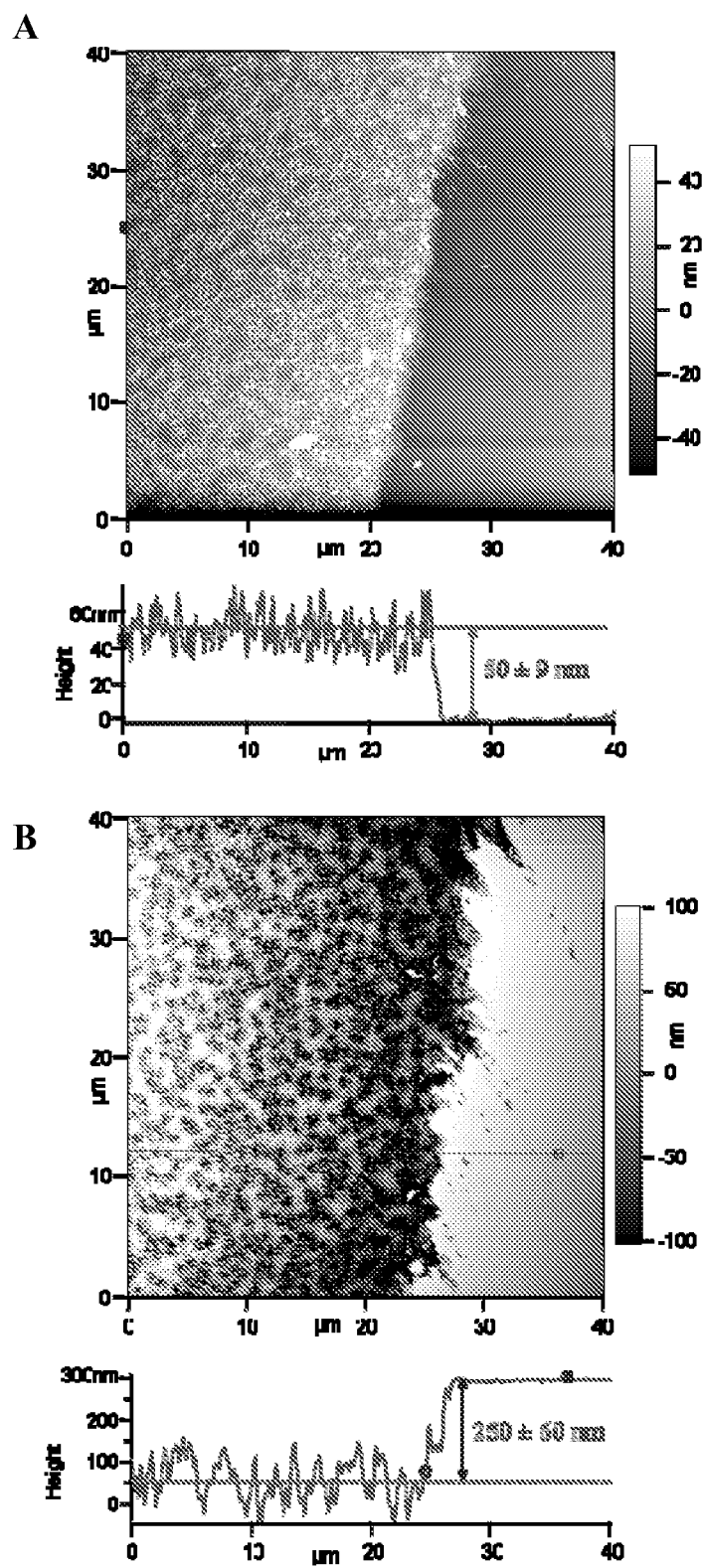
FIG. 14. AFM image of a 10 mg/ml PEG-DOHA$_4$ coating in air and water. The thickness is 50±9 nm in air and 250±60 nm in water.

The thickness of dry (equilibrated in room air) and wet (fully swelled in water) coatings was also measured using tapping mode atomic force microscopy. After storage in room conditions for 2 days, the hydrogel coating was immersed in deionized ultra-pure water for at least 2 h before measuring the wet thickness. The dry thickness measured by the AFM is in good agreement with the obtained ellipsometry data. However, the wet thickness is 5 times as high as the dry one (see FIG. 14).

Figure 6:
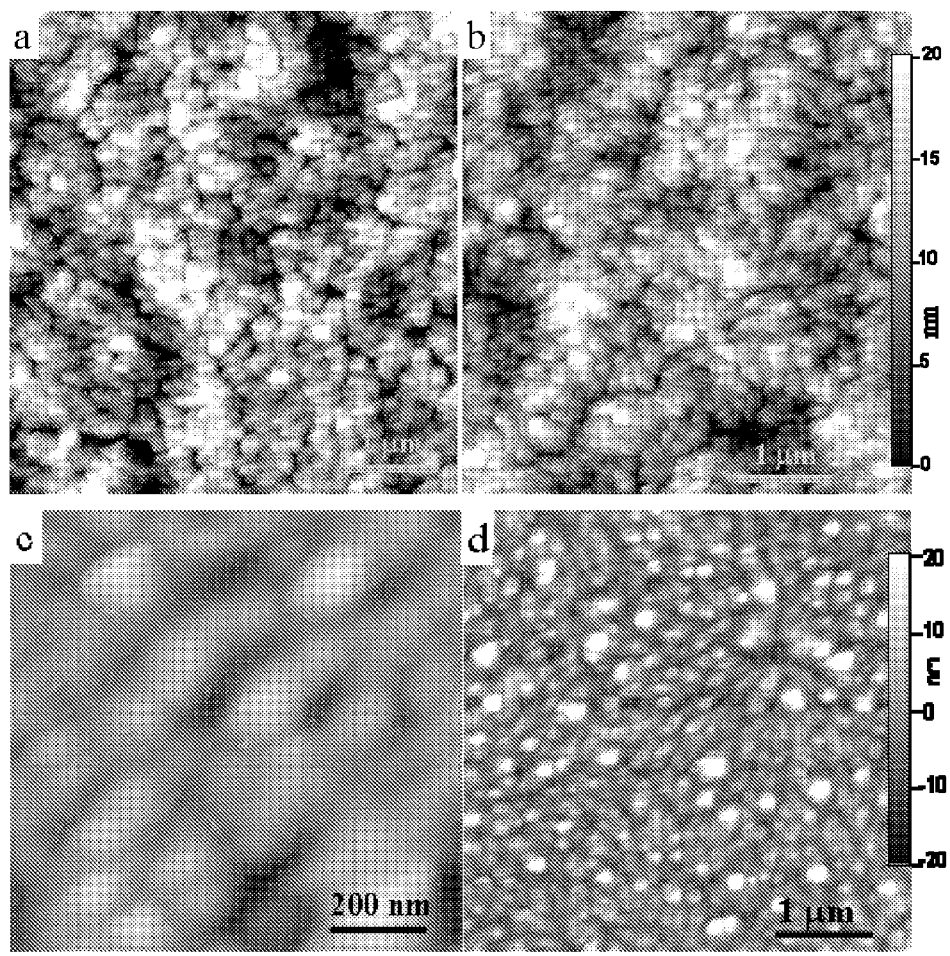
FIG. 6. AFM height images in air of films spin coated from a) 5 mg/mL and b) 10 mg/mL solutions of PEG-DOHA$_4$-IO$_4$; c) 5 mg/mL and d) 10 mg/mL PEG-DOHA$_4$-Ag.
Figure 15:
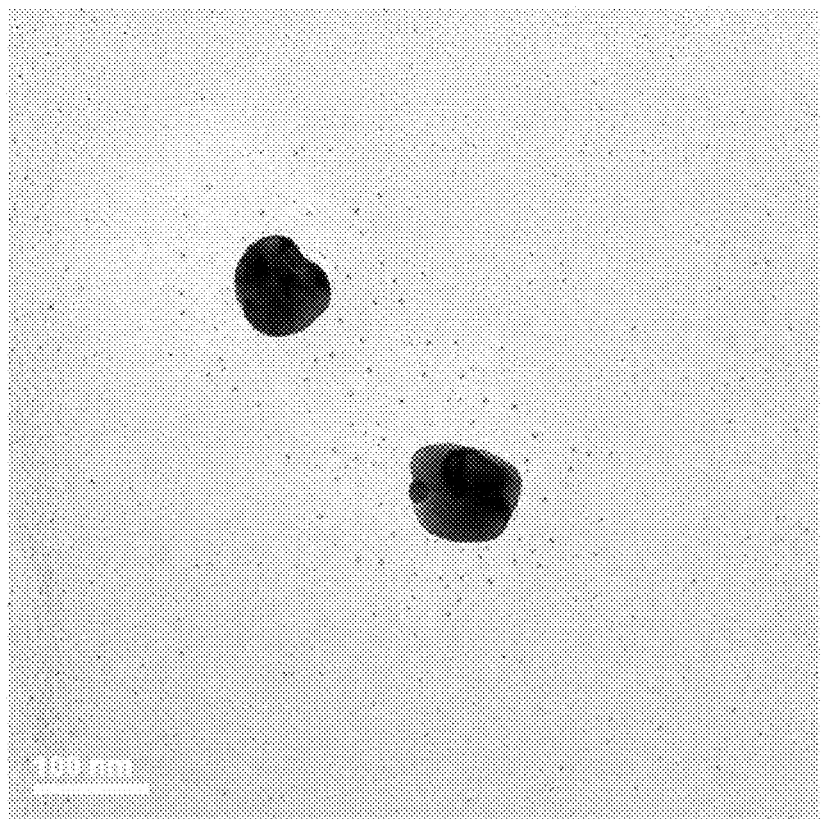
FIG. 15. TEM image of PEG-DOHA$_4$ stabilized silver nanoparticles. The small particles are around 5 nm and the large ones are about 100 nm.
Figure 16:
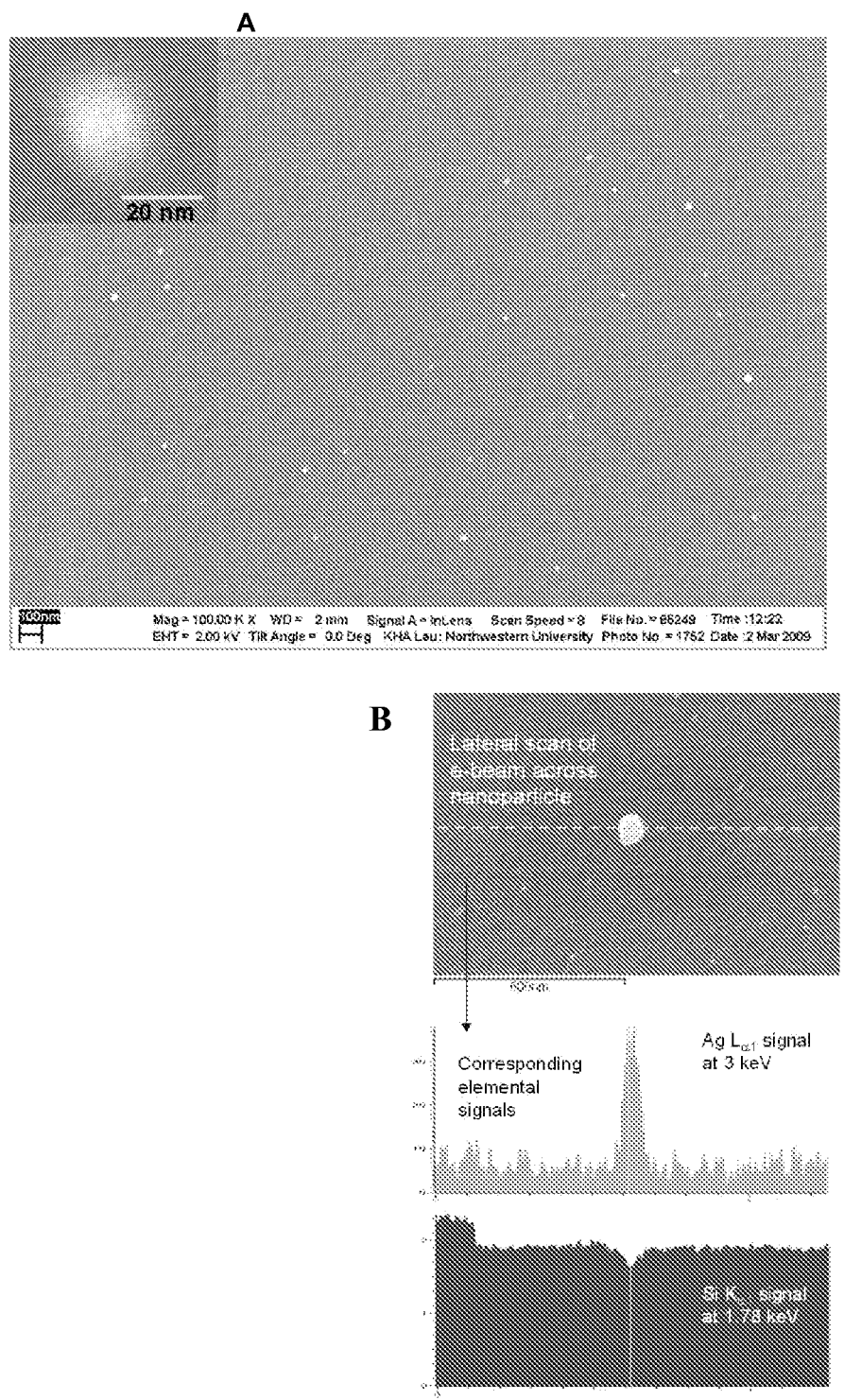
FIG. 16. (A) SEM image of silver nanoparticles inside the PEG-DOHA$_4$ coating. (B) EDX elemental line scan across one of the larger nanoparticles shows pronounced Ag content, with a corresponding decrease in the Si signal from the wafer substrate.
Figure 17:
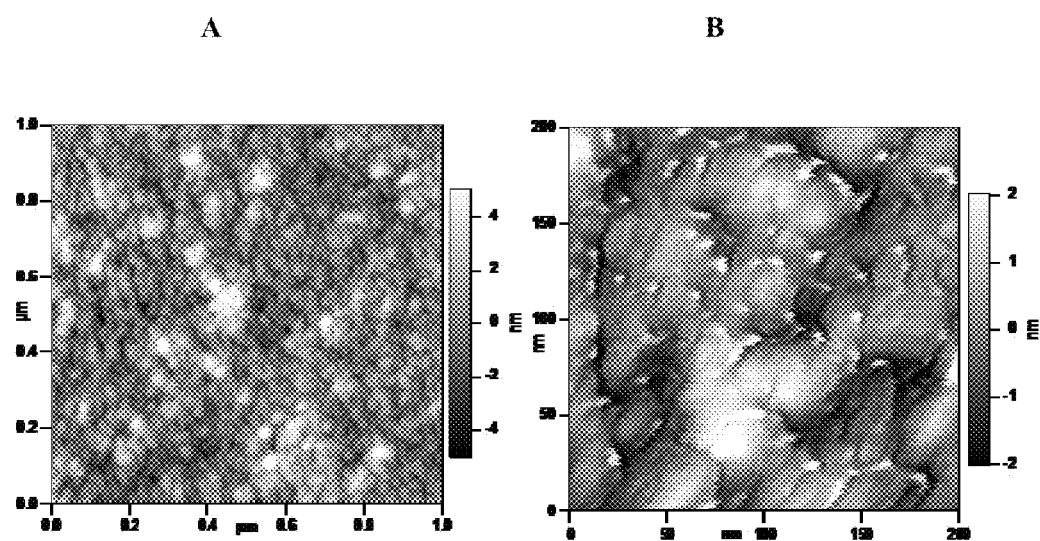
FIG. 17. AFM image describing the morphology of adsorbed fibrinogen on a TiO$_2$ surface.

The AFM height image of the PEG-DOHA$_4$ hydrogel coating prepared from 5 mg/mL polymer solution containing NaIO$_4$ (PEG-DOHA$_4$-IO$_4$; FIG. 6a) reveals small surface features 100-200 nm in lateral dimension and only 5-8 nm in height. Since the 4-armed PEG-DOHA$_4$, with M$_w$~10,000, have a contour length of less than 46 nanometers, the presence of the submicron particulate features suggests that the coating was composed of crosslinked PEG-DOHA$_4$ aggregate structures. Coatings prepared from a 10 mg/mL polymer concentration exhibited even finer structures (as shown in FIG. 6b). When AgNO$_3$ was incorporated into the polymer solution, the reduced silver formed nanoparticles (see FIG. 15). These nanoparticles were stabilized by PEG-DOHA$_4$ and increased the elastic strength of PEG-DOHA$_4$ hydrogels. The nanoparticles reduced on the surface of these hydrogel/Ag nanoparticle hybrid films could also be easily identified as individual ~20 nm high protrusions against the background surface of the crosslinked hydrogel film (FIGS. 6c and 6d).

Water contact angle measurements showed that both the advancing and receding angles, as well as the static contact angle, were not dependent on the film thickness. For the crosslinked PEG-DOHA$_4$ hydrogel coatings, the static, advancing and receding contact angles were 46.9±1.2°, 56.4±1.1°, and 34.3±3.2°, respectively. These values correspond to only a moderately hydrophilic coating surface. The surface structure of the coatings was further investigated by XPS analysis of the surface atomic composition.

Figure 18:
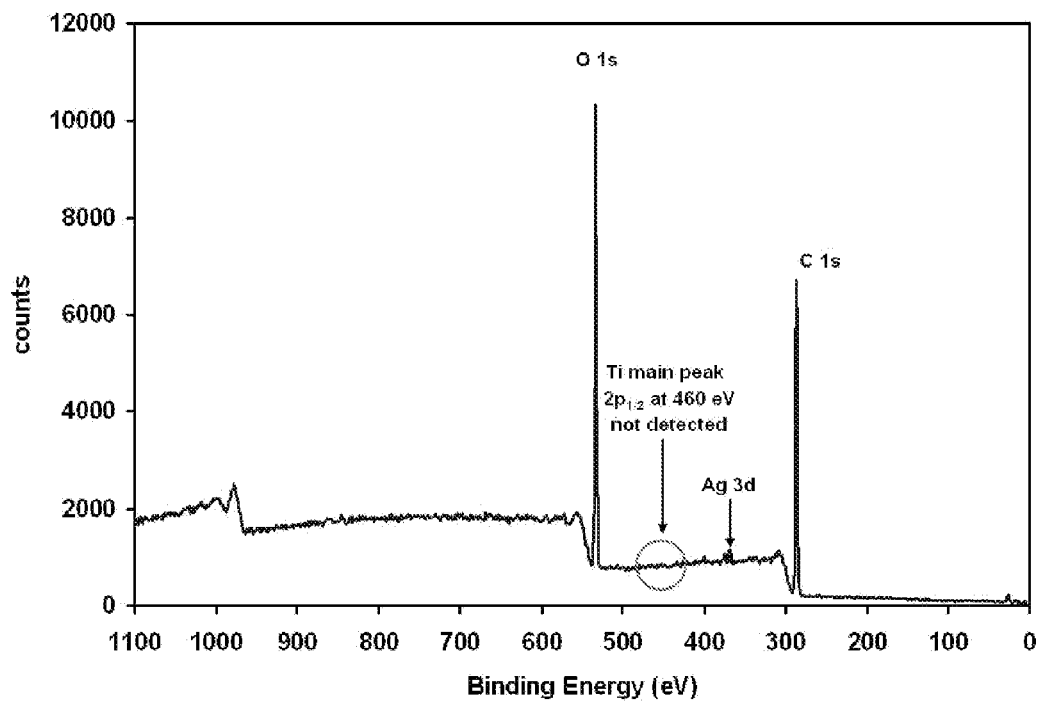
FIG. 18. XPS survey scan of the PEG-DOHA4 hydrogel/Ag nanoparticle hybrid film. The elements oxygen, carbon and silver were detected. No signal corresponding to the presence of Ti was detected.
Figure 19:
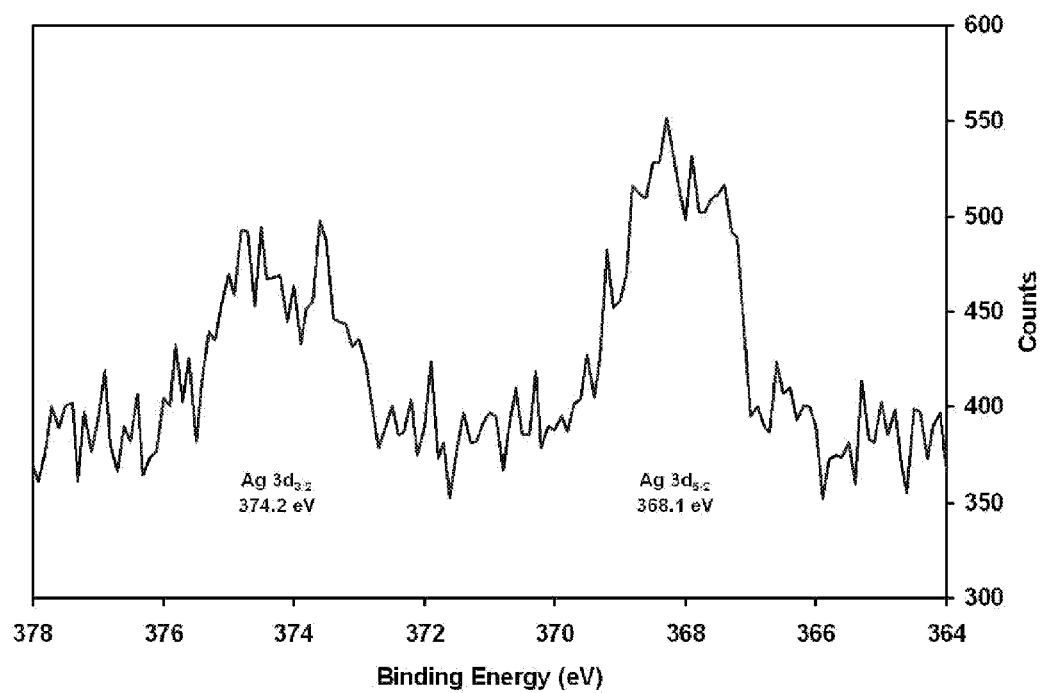
FIG. 19. High resolution XPS scan within the binding energy range characteristic of the Ag 3d shell, corresponding to the same PEG-DOHA4 hydrogel/Ag nanoparticle hybrid film shown in FIG. 18.

Energy signatures corresponding to Ti, which might have originated from the $TiO_2$ substrate, were not detected in XPS measurements (see FIGS. 18 and 19). Since the sampling depth in XPS is <10 nm, this absence implies that, consistent with the ellipsometry and AFM data, the spin-coated PEG-DOHA$_4$ hydrogel films had a thickness >10 nm and that the coating completely covered the surface. On the other hand, Ag was detected at an atomic percentage of 0.3% (Table 1). In comparison, two-times molar excess of $AgNO_3$ relative to the catechol content was added to the hydrogel film precursor solution, which translates to approximately 1.1% catechol units relative to the combined number of carbon and oxygen atoms in the $M_w$~10,000 4-armed PEG.

Hydrogel film antifouling properties. The antifouling hydrogel of the present invention has many antifouling properties, described in turn below.

Figure 7:
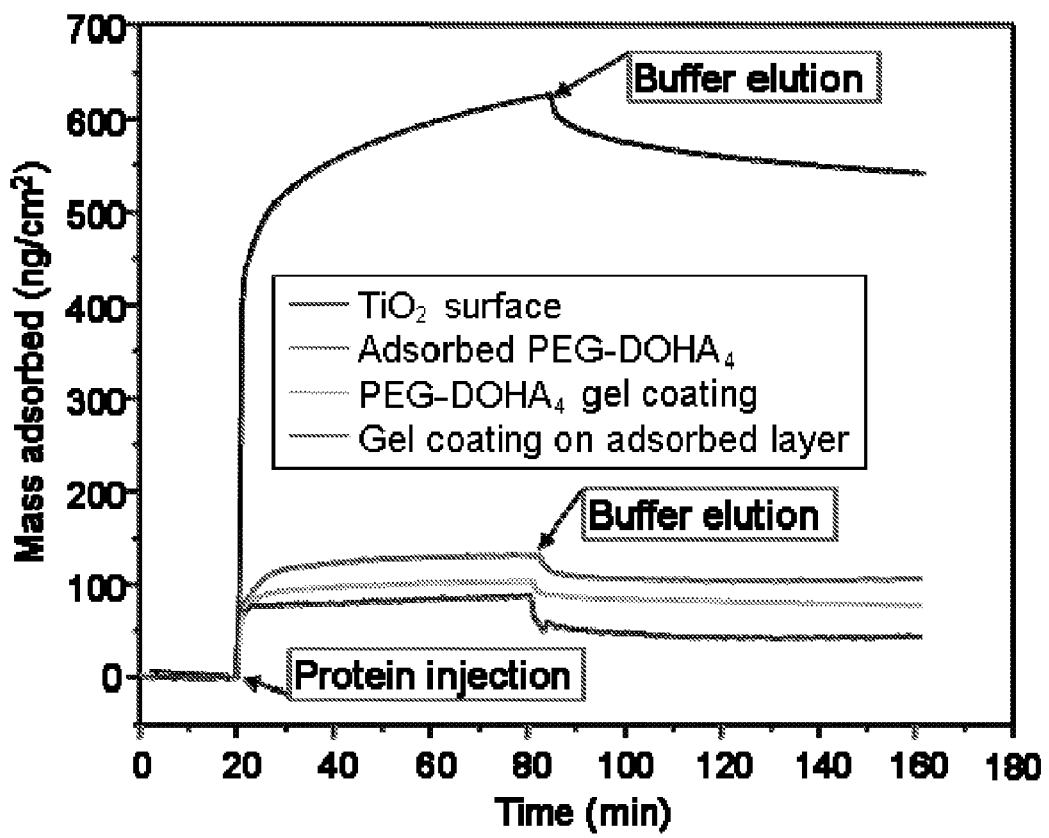
FIG. 7. Fibrinogen adsorption curves of different surfaces from 3.0 mg/mL solution in HEPES buffer at 37° C.

Resistant to protein adsorption. Fibrinogen adsorption curves on untreated $TiO_2$, adsorbed PEG-DOHA$_4$ (uncrosslinked), and hydrogel coated surfaces (crosslinked with $IO_4^-$) are shown in FIG. 7. The equilibrium amounts of fibrinogen adsorbed after elution with the buffer are listed in Table 2. Protein adsorption was suppressed from 524 ng/cm$^2$ on untreated $TiO_2$, to 78 ng/cm$^2$ on the PEG-DOHA$_4$ hydrogel coated surface. In comparison, the adsorbed PEG-DOHA$_4$ retained a slightly higher amount of adsorbed fibrinogen, at 103 ng/cm$^2$.

FIG. 7 also shows the adsorption measured on a PEG-DOHA$_4$-coated sample prepared by the two-step pre-treatment process described above. Here, an uncross-linked adsorbed PEG-DOHA$_4$ hydrogel was spin-coated with an additional layer of PEG-DOHA$_4$ crosslinked with $IO_4^-$. This two-step process ensured a maximum surface density of PEG-DOHA$_4$ within the hydrogel coating. Accordingly, the amount of fibrinogen adsorbed dropped to 43 ng/cm$^2$, indicating more than 91% suppression of protein adsorption.

Figure 8:
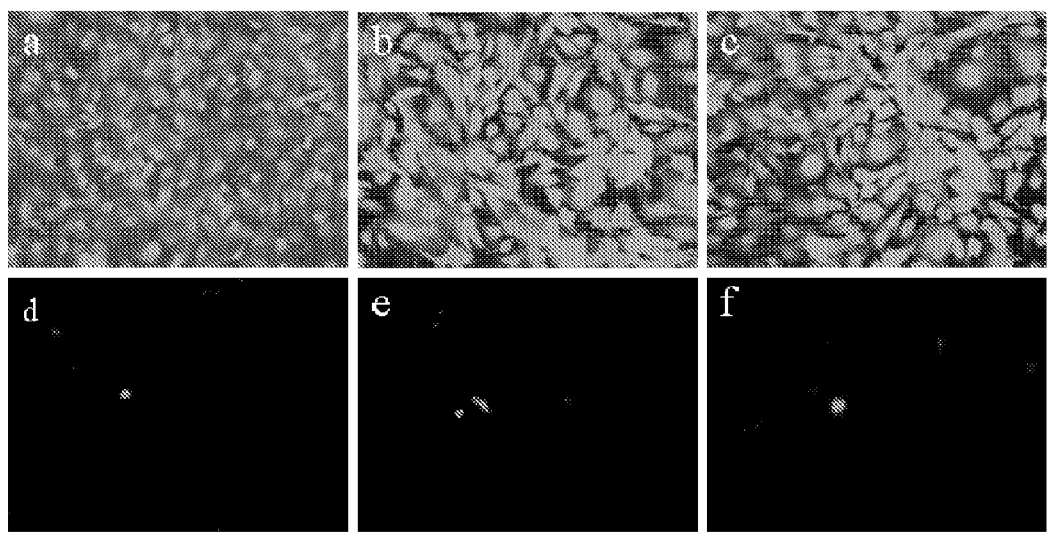
FIG. 8. Fluorescence micrographs of 3T3 fibroblast cell adhesion at 72 h on surfaces of A) PS; B) Ti; C) TiO$_2$; D) 5 mg/mL PEG-DOHA4-IO$_4^-$ coating; E) 5 mg/mL PEG-DOHA$_4$-IO$_4^-$ coating heated at 100° C. for 30 min; and F) 5 mg/mL PEG-DOHA$_4$-Ag$^+$ coating heated at 100° C. for 1 h.
Figure 9:
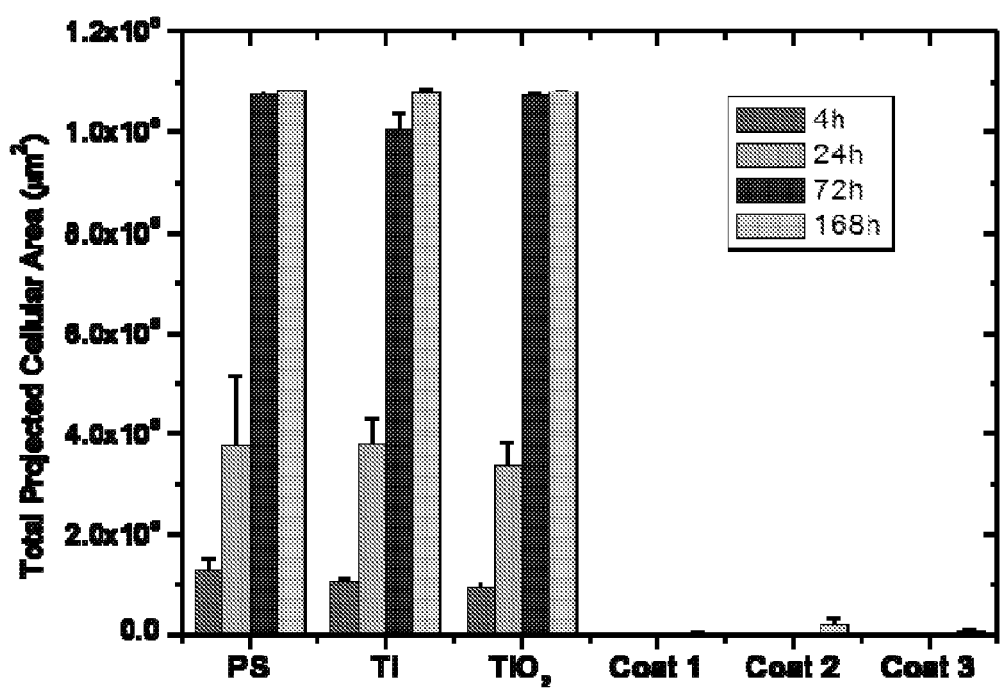
FIG. 9. 3T3 fibroblast cell adhesion on surfaces after different culture periods at 37° C. and 5% CO$_2$. Coat 1 and coat 2 are 5 mg/mL PEG-DOHA$_4$-NaIO$_4$ spin-coatings of 25 nm dry thickness without and with 1h heat at 100° C., respectively; coat 3 is 5 mg/mL PEG-DOHA$_4$-AgNO$_3$ spin-coatings of 25 nm dry thickness heated at 100° C. for 1h.
Figure 10:
FIG. 10. S. Epidermidis adhesion on TiO$_2$ and PEG-DOHA$_4$ coated surfaces at 24 h at 37° C. The modified surface was a 5 mg/mL PEG-DOHA$_4$-NaIO$_4$ spin-coating or 5 mg/mL PEG-DOHA$_4$-AgNO$_3$ spin-coating with 25 nm dry thickness heated at 100° C. for 1h.
Figure 11:
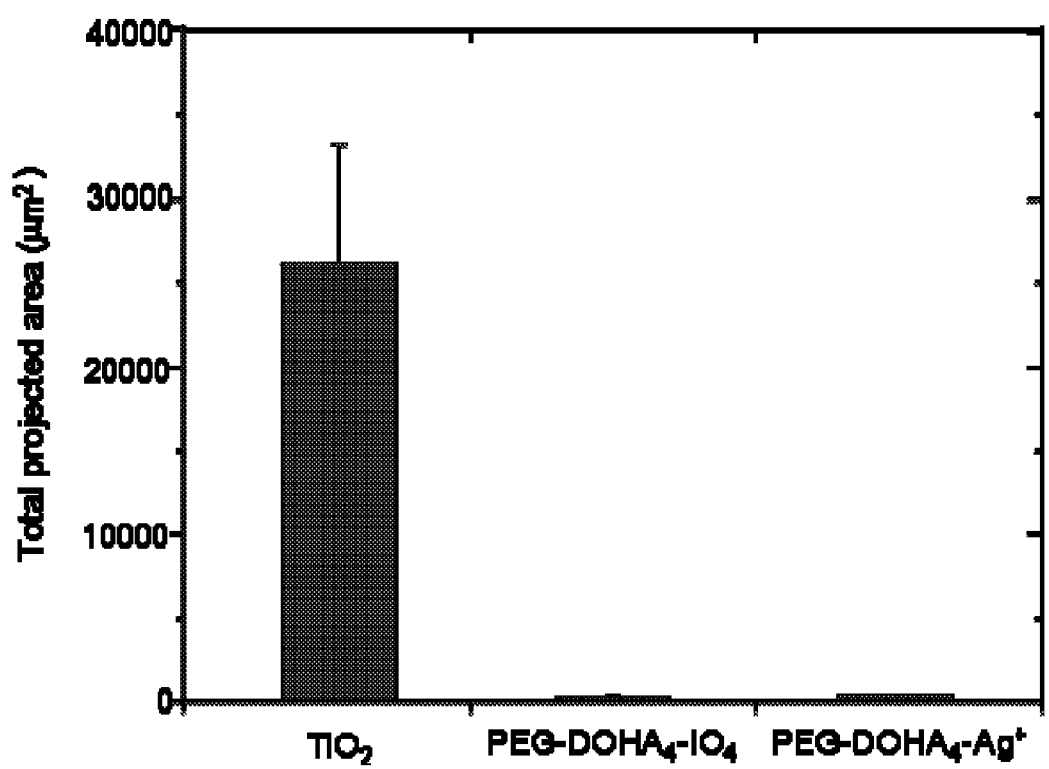
FIG. 11. S. Epidermidis adhesion on TiO$_2$, PEG-DOHA$_4$-NaIO$_4$ and PEG-DOHA$_4$-AgNO$_3$ hydrogel coating (1 h heat at 100° C.). Surfaces were exposed to bacteria suspension at 37° C. for 1 day.

Resistance to mammalian cell and bacteria cell adhesion. Cellular attachment and bacterial colonization on medical device surfaces can also lead to complications for patients and increased healthcare costs. Following initial protein adsorption, cellular or bacterial attachment to surfaces may occur under physiological conditions. 3T3 fibroblast cell adhesion on the hydrogel coatings of the present invention was less than 0.1% of that on unmodified polystyrene, Ti and $TiO_2$ surfaces (FIGS. 8-9), which implies 99.9% suppression of fibroblast adhesion. Adhesion of S. epidermidis on $TiO_2$ and hydrogel coatings using from 5 mg/mL PEG-DOHA$_4$-NaIO$_4$ and 5 mg/mL PEG-DOHA$_4$-AgNO$_3$, is depicted in FIGS. 10-11. 99% suppression in S. Epidermidis adhesion was observed on all the hydrogel coating surfaces after a 1 day exposure at 37° C.

Discussion.

Biomimetically-modified poly(ethylene glycol) hydrogel coatings with tunable thickness were developed through oxidative crosslinking and spin coating onto different substrates. Higher concentration of the polymer solution produced a more closely packed hydrogel coating. These coatings can swell in water to five-times of its dry thickness. Heated films showed cross-linked network structure. The hydrogel coatings of the present invention exhibited significantly reduced fibrinogen adsorption (90%), S. Epidermidis (99%) and 3T3 fibroblast cell (99.5%) attachment as compared to unmodified substrates, which suggests the potential use of these polymers as biofouling resistant coatings.

It should be noted that the above description, attached figures and their descriptions are intended to be illustrative and not limiting of this invention. Many themes and variations of this invention will be suggested to one skilled in this and, in light of the disclosure. All such themes and variations are within the contemplation hereof. For instance, while this invention has been described in conjunction with the various exemplary embodiments outlined above, various alternatives, modifications, variations, improvements, and/or substantial equivalents, whether known or that rare or may be presently unforeseen, may become apparent to those having at least ordinary skill in the art. Various changes may be made without departing from the spirit and scope of the invention. Therefore, the invention is intended to embrace all known or later-developed alternatives, modifications, variations, improvements, and/or substantial equivalents of these exemplary embodiments.

REFERENCES

1. Gasteier et al, *Macromolecular Bioscience* 2007, 7, (8), 1010-1023.
2. Ratner et al, *Annual Review of Biomedical Engineering* 2004, 6, 41-75.
3. Ratner et al, *Biomaterials Science* 2004, 201-218.
4. Lucke et al, *Biomaterials* 2000, 21, (23), 2361-2370.
5. Pavey et al, *Biomaterials* 1999, 20, (9), 885-890.
6. Li et al, *Biomacromolecules* 2006, 7, (11), 3112-3119.
7. Chi et al, *Chemistry—An Asian Journal* 2009, 4, (1), 135-142.
8. Cerruti et al, *Langmuir* 2008, 24, (19), 10646-10653.
9. Zhang et al, *J. Physical Chemistry* 2009, 113 (12), 4839-4847.
10. Ernst et al, *Langmuir* 2008, 24, (18), 10259-10264.
11. Jans et al, *Langmuir* 2008, 24, (8), 3949-3954.
12. Yeh et al, *Langmuir* 2008, 24, (9), 4907-4916.
13. Shah et al, *Langmuir* 2008, 24, (13), 6837-6844.
14. Schlapak, R et al, *Langmuir* 2007, 23, (20), 10244-10253.
15. McNamee et al, *Langmuir* 2007, 23, (8), 4389-4399.
16. Lan et al, *Biosensors & Bioelectronics* 2005, 20, (9), 1697-1708.
17. Popat et al, *Langmuir* 2004, 20, (19), 8035-8041.
18. Sun et al, *Electrophoresis* 2008, 29, (13), 2760-2767.
19. Fan, X.; Lin, L.; Dalsin, J. L.; Messersmith, P. B., *J. Am. Chem. Soc.* 2005, 127, (45), 15843-15847.
20. Iguerb et al, *Surface and Interface Analysis* 2008, 40, (3-4), 386-390.
21. Khire et al, *Macromolecules* 2006, 39, (15), 5081-5086.
22. Liu et al, *Macromolecular Rapid Communications* 2007, 28, (3), 305-314.
23. Sebra et al, *Acta Biomaterialia* 2007, 3, (2), 151-161.
24. Sugiura et al, *Colloids and Surfaces, B: Biointerfaces* 2008, 63, (2), 301-305.
25. Wagner et al, *J. Biomedical Materials Research*, Part A 2003, 66A, (1), 62-78.
26. Zhu et al, *Chemical Communications* 2006, (2), 153-155.
27. Schmidt et al, *J. Applied Polymer Science* 2003, 87, (8), 1255-1266.
28. Schlapak et al, *Langmuir* 2006, 22, (1), 277-285.
29. Dimitrov et al, *Macromolecules* 2006, 39, (6), 2423-2426.
30. Sun et al, *Bioconjugate Chemistry* 2006, 17, (1), 52-57.
31. Sinclair et al, *Biomaterials* 2006, 27, (9), 2090-2094.
32. Zhen et al, *Langmuir* 2004, 20, (24), 10464-10473.
33. Hoffmann et al, *J. Biomaterials Science*, Polymer Edition 2006, 17, (9), 985-996.

34. Groll et al, *J. Biomedical Materials Research. Part A* 2005, 74, (4), 607-17.
35. Dalton et al, *Macromolecular Bioscience* 2008, 8, (10), 923-931.
36. Groll et al, *Langmuir* 2005, 21, (5), 1991-1999.
37. Ito et al, *Acta Biomaterialia* 2007, 3, (6), 1024-1032.
38. Lee, Y.; Lee, H.; Kim, Y. B.; Kim, J.; Hyeon, T.; Park, H.; Messersmith, P. B.; Park, T. G., *Advanced Materials* 2008, 20, (21), 4154-4157.
39. Lee, H.; Rho, J.; Messersmith, P. B., *Advanced Materials* 2009, 21, (4), 431-434.
40. Lee, H.; Lee, Y.; Statz, A. R.; Rho, J.; Park, T. G.; Messersmith, P. B., *Advanced Materials* 2008, 20, (9), 1619-1623.
41. Lee, H.; Messersmith, P. B., *Nanotechnology in Biology and Medicine* 2007, 3/1-3/20.
42. Lee, H.; Lee, B. P.; Messersmith, P. B., *Nature* 2007, 448, (7151), 338-341.
43. Catron, N. D.; Lee, H.; Messersmith, P. B., *Biointerphases* 2006, 1, (4), 134-141.
44. Dalsin, J. L.; Hu, B.-H.; Lee, B. P.; Messersmith, P. B., *J. Am. Chem. Society* 2003, 125, (14), 4253-4258.
45. Dalsin, J. L.; Lin, L.; Tosatti, S.; Voeroes, J.; Textor, M.; Messersmith, P. B., *Langmuir* 2005, 21, (2), 640-646.
46. Statz, A.; Finlay, J.; Dalsin, J.; Callow, M.; Callow, J. A.; Messersmith, P. B., *Biofouling* 2006, 22, (6), 391-399.
47. Lensen et al, *Langmuir* 2007, 23, (14), 7841-7846.
48. Wei et al, *J. Polymer Science, Part A: Polymer Chemistry* 2005, 43, (13), 2941-2949.
49. Alexandre et al, *Macromolecular Bioscience* 2004, 4, (7), 639-648.
50. Keys et al, *Macromolecules* 1998, 31, (23), 8149-8156.
51. Cima et al, *Macromolecules* 1995, 28, (20), 6787-94.
52. Nagahama et al, *J. Polymer Science, Part A: Polymer Chemistry* 2008, 46, (18), 6317-6332.
53. Hiemstra et al, *J. American Chemical Society* 2007, 129, (32), 9918-9926.
54. Yamaguchi et al, *Biomacromolecules* 2005, 6, (4), 1921-1930.
55. Lee, B. P.; Dalsin, J. L.; Messersmith, P. B., *Biomacromolecules* 2002, 3, (5), 1038-1047.
56. Lee, B. P.; Chao, C.-Y.; Nunalee, F. N.; Motan, E.; Shull, K. R.; Messersmith, P. B., *Macromolecules* 2006, 39, (5), 1740-1748.
57. Scofield, J. H., *J. Electron Spectroscopy and Related Phenomena* 1976, 8, (2), 129-37.
58. Kurrat et al, *Colloids and Surfaces, B: Biointerfaces* 1998, 11, (4), 187-201.
59. Voros et al, *Biomaterials* 2002, 23, (17), 3699-3710.
60. De Feijter et al, *Biopolymers* 1978, 17, (7), 1759-72.
61. Chapman et al, *Langmuir* 2001, 17, (4), 1225-1233.

What is claimed is:

1. An antifouling hydrogel resulting from the reaction between:
    a) an effective amount of a modified antifouling polymer having a structure according to Formula I:

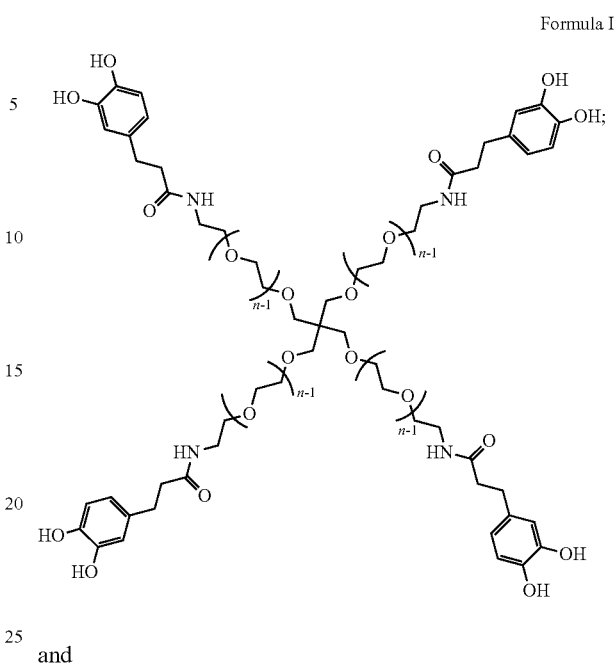

Formula I and
    b) an effective amount of at least one oxidizing reagent, whereby the antifouling hydrogel is formed.

2. The antifouling hydrogel of claim 1 wherein the at least one oxidizing reagent is selected from the group consisting of periodates, peroxides, permanganate, biological enzymes and peroxidases.

3. The antifouling hydrogel of claim 1 wherein the at least one oxidizing reagent is silver nitrate.

4. The antifouling hydrogel of claim 1 wherein the at least one oxidizing reagent is $NaIO_4$.

5. The antifouling hydrogel of claim 1 wherein the oxidizing reagent comprises silver nitrate and $NaIO_4$ in a 4:1 ethanol:water solution.

6. A method of reducing or eliminating protein or microorganism adhesion on a surface, the method comprising the steps of contacting a portion of a surface with an antifouling hydrogel according to claim 1, wherein the hydrogel is immobilized on the surface, thereby reducing or eliminating protein or cell adhesion on the contacted surface.

7. A method of reducing or eliminating protein or microorganism adhesion on a surface, the method comprising the steps of:
    a) contacting a portion of a surface with an effective amount of antifouling polymer to provide an adsorbed polymer layer on the surface;
    b) contacting a portion of the adsorbed polymer layer on the surface with an effective amount of an antifouling hydrogel according to claim 1, whereby the hydrogel is immobilized on the surface,
    wherein the immobilized hydrogel thereby reduces or eliminates protein or cell adhesion on the contacted surface.

8. A method of synthesizing an antifouling hydrogel comprising
    reacting a modified antifouling polymer having a structure according to Formula I:

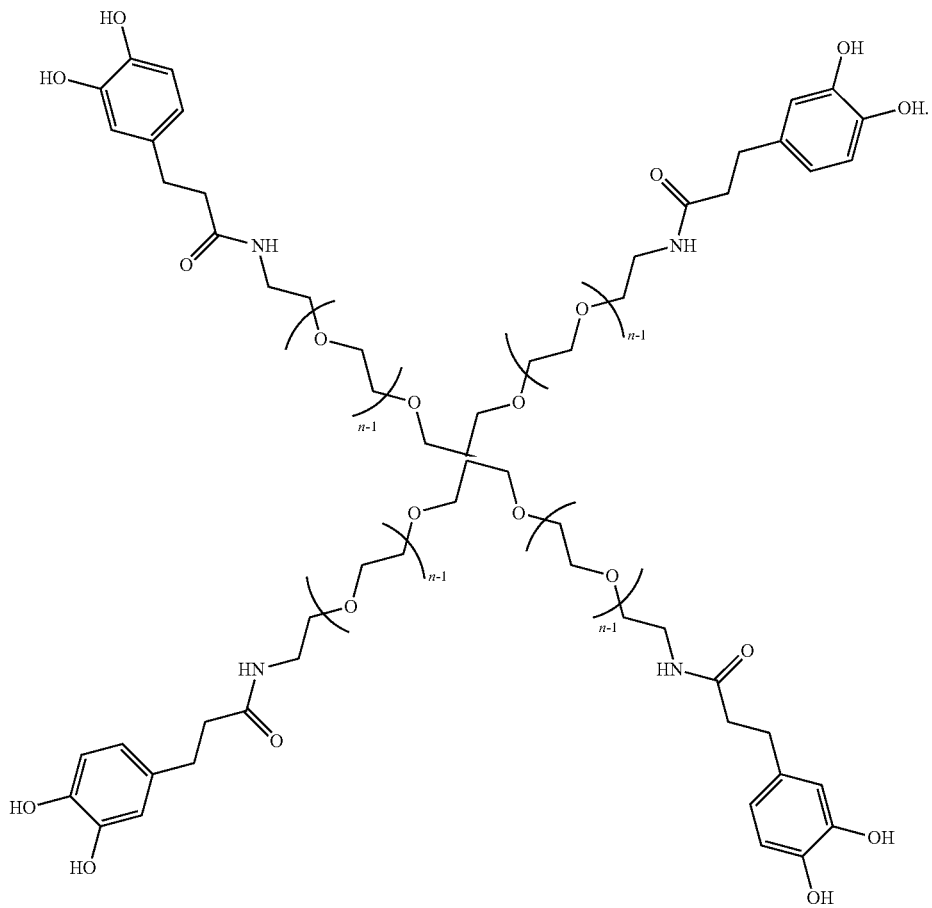

Formula I with at least one oxidizing agent;
thereby providing an antifouling hydrogel.

9. The method of claim 8 wherein the at least one oxidizing reagent is selected from the group consisting of periodates, peroxides, permanganate, biological enzymes and peroxidases.

10. The method of claim 8 wherein the at least one oxidizing reagent is silver nitrate.

11. The method of claim 8 wherein the at least one oxidizing reagent is $NaIO_4$.

12. The method of claim 8 wherein the at least one oxidizing reagent comprises silver nitrate and $NaIO_4$ in a 4:1 ethanol:water solution.

13. A method of synthesizing an antifouling hydrogel that is immobilized on a surface comprising the steps of:

a) reacting an effective amount of PEG with an effective amount of DOHA to yield a modified PEG having a structure according to Formula I:

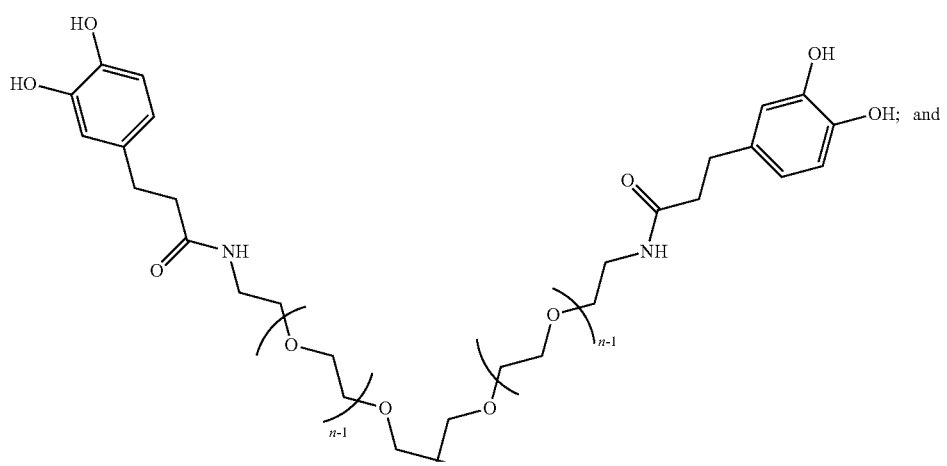

Formula I

-continued

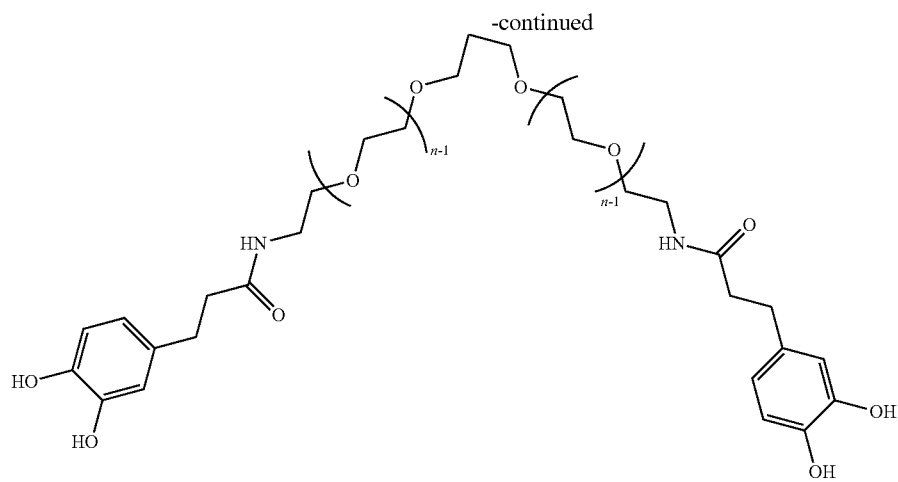

20 b) reacting an effective amount of Formula I with an effective amount of silver nitrate and NaIO$_4$ in a 4:1 ethanol:water solution to provide a modified Formula I comprising oxidized catechol-end groups; and c) coating the modified Formula I comprising oxidized catechol-end groups to a surface, whereby the hydrogel formed is immobilized on the surface;

thereby yielding an antifouling hydrogel that is immobilized on the surface.

* * * * *